(12) United States Patent
Wu et al.

(10) Patent No.: US 12,513,527 B2
(45) Date of Patent: Dec. 30, 2025

(54) USER PLANE SECURITY ENFORCEMENT INFORMATION DETERMINING METHOD, APPARATUS, AND SYSTEM

(71) Applicant: Huawei Technologies Co., Ltd., Shenzhen (CN)

(72) Inventors: Yizhuang Wu, Beijing (CN); He Li, Shanghai (CN); Li Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 18/071,314

(22) Filed: Nov. 29, 2022

(65) Prior Publication Data

US 2023/0090543 A1 Mar. 23, 2023

Related U.S. Application Data

(63) Continuation of application No. PCT/CN2021/095434, filed on May 24, 2021.

(30) Foreign Application Priority Data

May 30, 2020 (CN) .......................... 202010480965.0

(51) Int. Cl.
*H04W 12/50* (2021.01)
*H04W 12/102* (2021.01)
(Continued)

(52) U.S. Cl.
CPC ......... *H04W 12/50* (2021.01); *H04W 12/102* (2021.01); *H04W 76/14* (2018.02); *H04W 88/04* (2013.01)

(58) Field of Classification Search
CPC ... H04W 12/50; H04W 12/102; H04W 76/14; H04W 88/04; H04W 12/033;
(Continued)

(56) References Cited

U.S. PATENT DOCUMENTS

2019/0082325 A1 3/2019 Muhanna et al.
2020/0100101 A1 3/2020 Torvinen et al.
(Continued)

FOREIGN PATENT DOCUMENTS

| CN | 110447252 A | 11/2019 |
| CN | 110830991 A | 2/2020 |
| CN | 110913389 A | 3/2020 |

OTHER PUBLICATIONS

"3rd Generation Partnership Project; Technical Specification Group Services and System Aspects; Study on system enhancement for Proximity based Services (ProSe) in the 5G System (5GS) (Release 17)," 3GPP TR 23.752 V0.3.0, Jan. 2020, 73 pages.
(Continued)

*Primary Examiner* — Mazda Sabouri
(74) *Attorney, Agent, or Firm* — Slater Matsil, LLP

(57) ABSTRACT

A user plane security enforcement information determining method and an apparatus are provided, to ensure a security requirement of transmitted data of a remote device. In this application, a session management network element may receive a first request for creating a relay-type session of a first terminal device. Then, the session management network element determines first user plane security enforcement information of the session based on first information, and sends the first user plane security enforcement information of the session to an access network device, where the first user plane security enforcement information of the session is for determining a first user plane security activation status of the session between the first terminal device and the access network device.

18 Claims, 11 Drawing Sheets

(51) Int. Cl.
*H04W 76/14* (2018.01)
*H04W 88/04* (2009.01)

(58) Field of Classification Search
CPC ..... H04W 76/11; H04W 76/18; H04W 12/02; H04W 88/14; H04W 12/10; H04W 12/37; H04W 28/0268
See application file for complete search history.

(56) References Cited

U.S. PATENT DOCUMENTS

| | | |
|---|---|---|
| 2021/0168594 A1 | 6/2021 | Wu et al. |
| 2021/0185524 A1 | 6/2021 | Wu et al. |
| 2022/0124488 A1* | 4/2022 | Tsiatsis ............... H04W 12/033 |
| 2022/0132375 A1* | 4/2022 | Khirallah ............. H04W 12/106 |
| 2022/0141898 A1* | 5/2022 | Kim ...................... H04W 76/14 |
| | | 370/315 |
| 2022/0287116 A1* | 9/2022 | Kim ...................... H04W 76/12 |

OTHER PUBLICATIONS

"Solution to support UE-to-Network Relay," Source: Samsung, Agenda Item: 8.6, Work Item / Release: FS_5G_ProSe / Rel-17, 3GPP SA WG2 Meeting #136, S2-1911343, SA WG2 Temporary Document, Nov. 18-22, 2019, Reno, US, 4 pages.

* cited by examiner

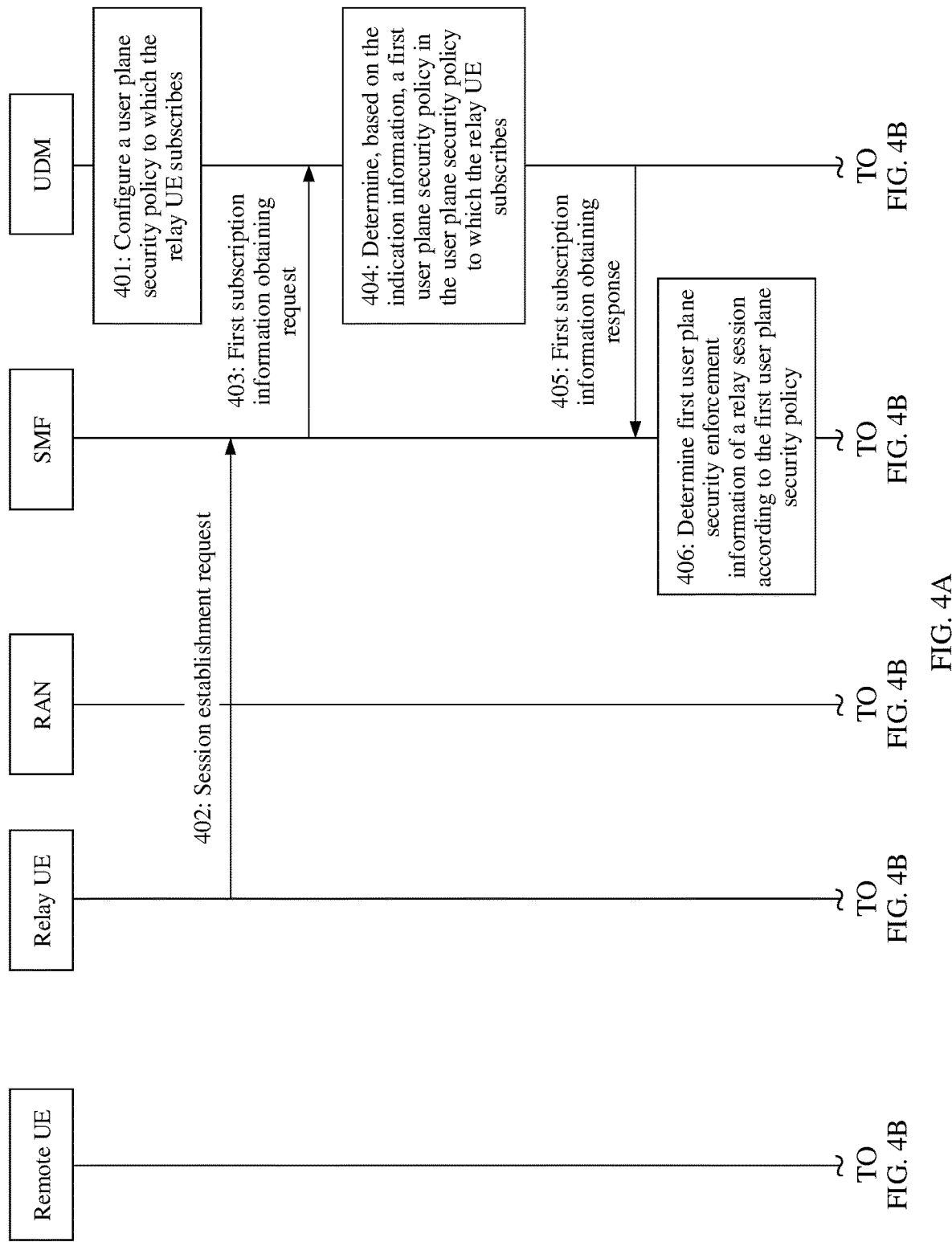

FIG. 4B

- 407: First user plane security enforcement information
- 408: First indication information
- 409: First direct communication request
- 410: Determine a security activation status of a PC5 interface based on a first security status of a first interface
- 411: First direct security mode command
- 412: First direct security mode complete message
- 413: First direct communication response

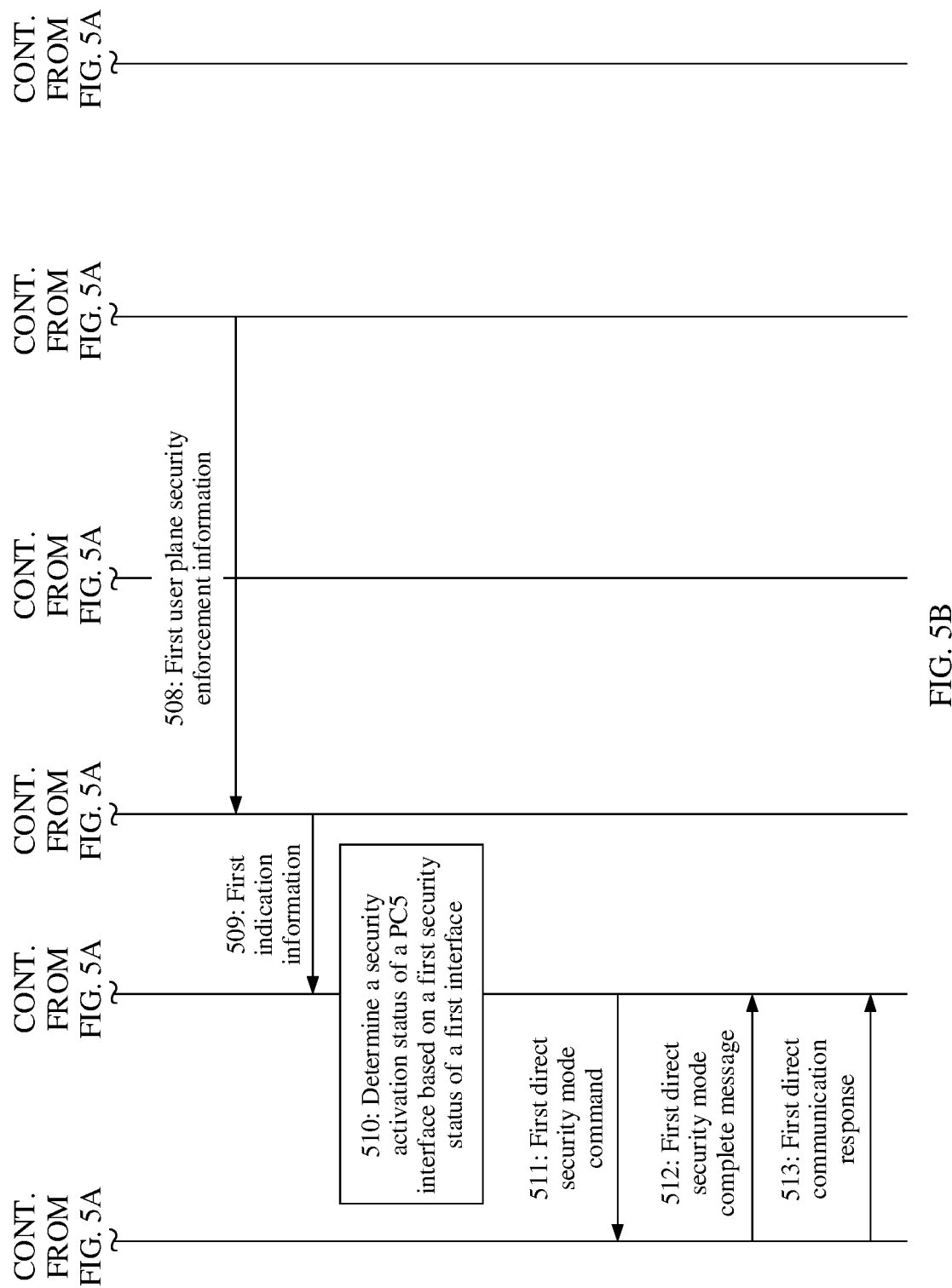

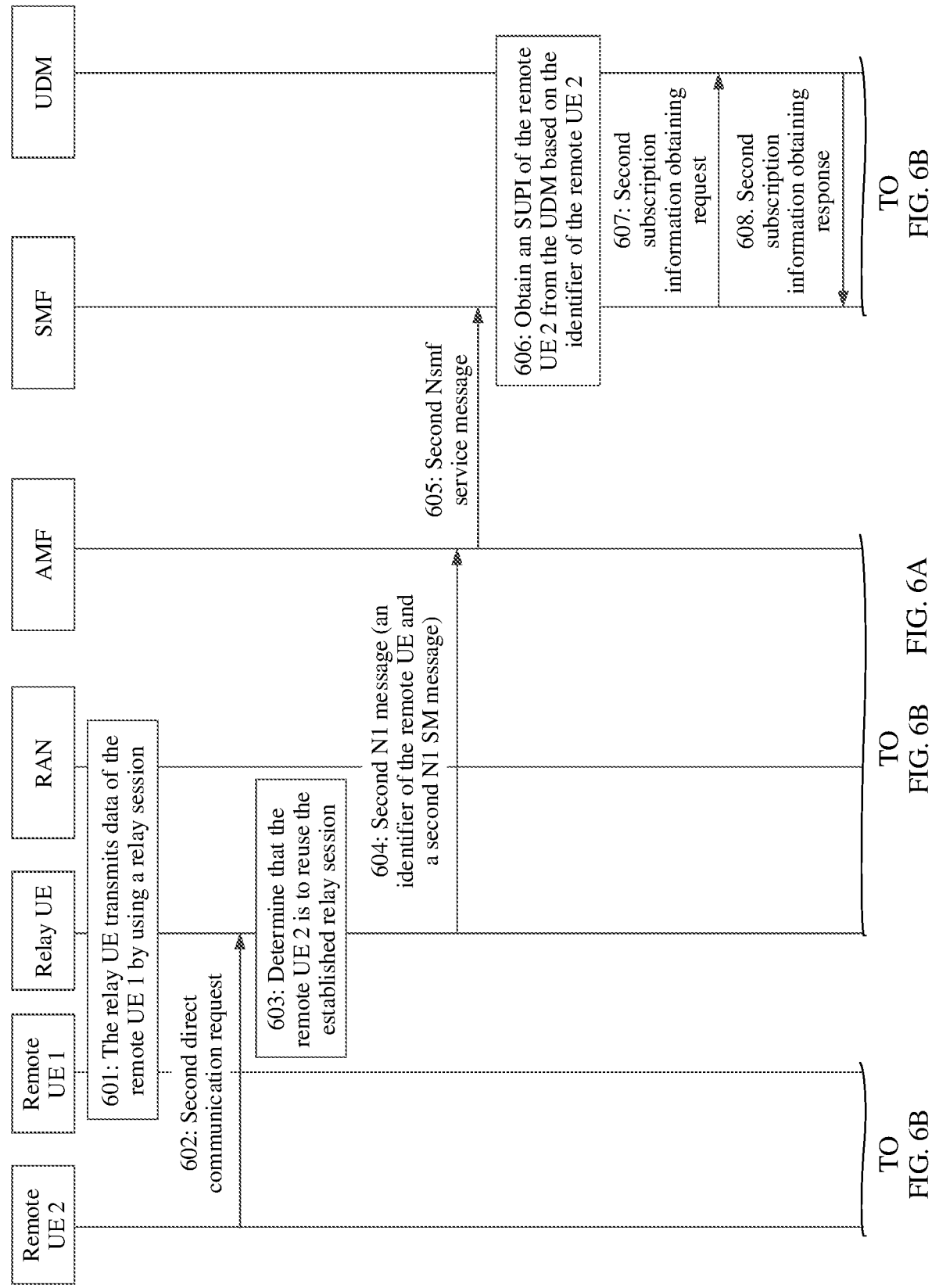

USER PLANE SECURITY ENFORCEMENT INFORMATION DETERMINING METHOD, APPARATUS, AND SYSTEM

CROSS-REFERENCE TO RELATED APPLICATIONS

This application is a continuation of International Application No. PCT/CN2021/095434, filed on May 24, 2021, which claims priority to Chinese Patent Application No. 202010480965.0, filed on May 30, 2020. The disclosures of the aforementioned applications are hereby incorporated by reference in their entireties.

TECHNICAL FIELD

This application relates to the field of communication technologies, and in particular, to a user plane security enforcement information determining method, an apparatus, and a system.

BACKGROUND

Currently, device to device (D2D) communication allows direct communication between user equipments (UEs). When a remote device (remote UE) is located outside coverage of a communication network or communication quality between the remote device and an access network device in the communication network is poor, the remote device may establish indirect communication with the communication network by using a relay device (relay UE) based on the D2D communication. The relay device may establish a protocol data unit (PDU) session for transmitting a service between the remote device and a data network, and transmit data received from the remote device to the data network by using the PDU session, or send data obtained from the data network to the remote device by using the PDU session.

In a process of establishing the PDU session, a session management network element obtains an identifier of the relay device, and obtains a user plane security policy of the session from a unified data management network element or locally by using the identifier of the relay device. Further, the session management network element determines user plane security enforcement information of the session according to the user plane security policy. The user plane security enforcement information is used by the access network device to configure a security activation status between the relay device and the access network device. In a process of determining the user plane security policy of the PDU session, the session management network element determines the user plane security enforcement information of the established PDU session based on subscription information or preconfigured information of the relay device. Because the established PDU session may be the PDU session that transmits the service between the remote device and the data network, it is possible that a method for determining user plane security protection by using only the subscription information or the preconfigured information of the relay device cannot satisfy a security requirement of the transmitted data of the remote device.

SUMMARY

This application provides a user plane security enforcement information determining method, an apparatus, and a system, to ensure a security requirement of transmitted data of a remote device.

According to a first aspect, an embodiment of this application provides a user plane security enforcement information determining method. The method includes: First, a session management network element may receive a first request from an access and mobility management network element, where the first request requests to create a relay-type session of a first terminal device, the first request includes first information, and the first information indicates that a type of the session is a relay type. Then, the session management network element determines first user plane security enforcement information of the session based on the first information; and then sends the first user plane security enforcement information of the session to an access network device, where the first user plane security enforcement information of the session is for determining a first user plane security activation status of the session between the first terminal device and the access network device.

According to the foregoing method, the session management network element may obtain a user plane security policy of the relay-type session by using the first information. Then, the determined first user plane security enforcement information can well satisfy a security requirement of a remote device, and ensure security of data of the remote device.

In a possible design, the first request may include an N1 SM container, and the N1 SM container includes the first information. In this case, the first request may be a session establishment request. The first request may alternatively include the first information and an N1 SM container. In this case, the first request includes a session establishment request and the first information. The N1 SM container is from the first terminal device.

According to the foregoing method, the first terminal device may send, to the session management network element by using the access and mobility management network element, the N1 SM container including the first information. The first information may alternatively be sent by the access and mobility management network element to the session management network element. That is, there are a plurality of composition forms of the first request that are applicable to different application scenarios.

In a possible design, when the session management network element determines the first user plane security enforcement information of the session based on the first information, the session management network element may first obtain a first user plane security policy based on the first information; and then may directly use the first user plane security policy as the first user plane security enforcement information of the session; or may perform further analysis with reference to other determining information (for example, a quality of service requirement), and determine the first user plane security enforcement information of the session according to the first user plane security policy.

According to the foregoing method, after obtaining the first user plane security policy, the session management network element may determine the first user plane security enforcement information in a plurality of manners.

In a possible design, that the session management network element obtains the first user plane security policy based on the first information includes: The session management network element sends a first subscription information obtaining request to a unified data management network element, where the first subscription information obtaining request may request a user plane security policy to which the first terminal device subscribes, and the user plane security policy to which the first terminal device subscribes indicates a user plane security policy of the relay-type session of the first terminal device and a user plane security policy of a non-relay-type session of the first terminal device. Then, the session management network element receives a first subscription information obtaining response from the unified data management network element, where the first subscription information obtaining response includes the user plane security policy to which the first terminal device subscribes. The session management network element determines, based on the first information, the first user plane security policy in the user plane security policy to which the first terminal device subscribes, and determines the user plane security policy of the relay-type session of the first terminal device as the first user plane security policy.

According to the foregoing method, after obtaining, from the unified data management network element, the user plane security policy to which the first terminal device subscribes, the session management network element may select, based on the first information, the first user plane security policy from the user plane security policy to which the first terminal device subscribes, so that user plane security enforcement information applicable to the relay session can be finally determined.

In a possible design, when the session management network element obtains the first user plane security policy based on the first information, the session management network element may send a first subscription information obtaining request to a unified data management network element, where the first subscription information obtaining request includes a relay indication, the relay indication requests a user plane security policy of the relay-type session of the first terminal device, and the relay indication may be the first information (where for this manner, refer to the foregoing content), or the relay indication may be determined based on the first information; and then, the session management network element receives a first subscription information obtaining response from the unified data management network element, where the first subscription information obtaining response includes a user plane security policy to which the first terminal device subscribes, and the user plane security policy to which the first terminal device subscribes includes the first user plane security policy.

According to the foregoing method, the session management network element may obtain, based on the relay indication from the unified data management network element, the user plane security policy to which the first terminal device subscribes. For example, when the first information is an identifier of a second terminal device, the relay indication may use in an explicit indication manner, so that the unified data management network element does not need to identify the identifier of the second terminal device, and can quickly determine the user plane security policy to which the first terminal device subscribes.

In a possible design, when the first information implicitly indicates that the type of the session is the relay type, for example, the first information may be a temporary identifier or an anonymous identifier of a second terminal device, the session management network element may first obtain an SUPI of the second terminal device based on the temporary identifier or the anonymous identifier of the second terminal device when obtaining the first user plane security policy based on the first request. For example, the session management network element may obtain the SUPI of the second terminal device from the unified data management network element. Then, the session management network element may send the first subscription information obtaining request to the unified data management network element, where the first subscription information obtaining request includes the SUPI of the second terminal device. Then, the session management network element receives the first subscription information obtaining response from the unified data management network element, where information carried in the first subscription information obtaining response may be any one of the following:

1. The first subscription information obtaining response includes the first user plane security policy.

2. The first subscription information obtaining response includes the user plane security policy of the relay-type session of the first terminal device. Then, the session management network element determines the first user plane security policy according to the user plane security policy of the relay-type session of the first terminal device.

3. The first subscription information obtaining response includes a user plane security policy to which the second terminal device subscribes. Then, the session management network element determines the first user plane security policy according to the user plane security policy to which the second terminal device subscribes.

According to the foregoing method, the session management network element may obtain the first user plane security policy from the unified data management network element in a plurality of different manners.

In a possible design, when the session management network element obtains the first user plane security policy based on the first request, the session management network element may send a first subscription information obtaining request to a unified data management network element, where the first subscription information obtaining request includes the first information. The session management network element receives a first subscription information obtaining response from the unified data management network element, where the first subscription information obtaining response includes the first user plane security policy.

According to the foregoing method, the session management network element may directly obtain the first user plane security policy from the unified data management network element. This manner is simpler and more efficient.

In a possible design, there are many manners in which the first information indicates that the type of the session is the relay type. For example, the first information uses an explicit indication manner. For example, the first information may be a pre-agreed field or character. For another example, the first information may alternatively use an implicit indication manner. For example, the first information is an identifier of the second terminal device, and the identifier of the second terminal device includes a part or all of the following: the temporary identifier of the second terminal device, the anonymous identifier of the second terminal device, or the subscription permanent identifier SUPI of the second terminal device.

According to the foregoing method, the first information may flexibly indicate, in different manners, that the type of the session is the relay type.

In a possible design, the first user plane security policy indicates that integrity protection is preferred. When determining the first user plane security enforcement information of the session according to the first user plane security policy, the session management network element may further refer to an integrity protection maximum data rate of the first terminal device. For example, if the session management network element determines that the integrity protection maximum data rate of the first terminal device is less than a data rate required by the session, the session management network element may determine that the integrity protection of the session is not needed, that is, the integrity protection of the session in the first user plane security enforcement information is not needed.

According to the foregoing method, in addition to ensuring a security requirement of the second terminal device, the first user plane security enforcement information determined by the session management network element can further ensure that the first terminal device can effectively transmit data of the second terminal device by using the session.

In a possible design, if the first user plane security policy indicates that integrity protection is required, the session management network element may send a session establishment reject response to the first terminal device after determining that an integrity protection maximum data rate of the first terminal device is less than a data rate required by the session, where the session establishment reject response indicates rejection of session establishment.

According to the foregoing method, after determining that the first terminal device cannot support data transmission of the second terminal device when the integrity protection is enabled, the session management network element may reject the establishment of the session, so that security of data of the second terminal device can be ensured.

In a possible design, the session management network element may further receive a third request, where the third request may indicate that a third terminal device is to use the session, the third request includes an identifier of the third terminal device, and the third request may be a session modification request, or may be another request. After determining, based on the identifier of the third terminal device, that the third terminal device is to use the session, the session management network element may determine second user plane security enforcement information of the session, and send the second user plane security enforcement information of the session to the access network device, where the second user plane security enforcement information of the session is for determining a second user plane security activation status of the session between the first terminal device and the access network device.

According to the foregoing method, the session management network element may update the user plane security enforcement information of the session, to be applicable to a security requirement of the third terminal device.

In a possible design, when determining the second user plane security enforcement information of the session based on the identifier of the third terminal device, the session management network element may determine a second user plane security policy based on the identifier of the third terminal device; and then may directly use the second user plane security policy as the second user plane security enforcement information of the session; or may determine the first user plane security enforcement information of the session according to the second user plane security policy with reference to other determining information (for example, a quality of service requirement).

According to the foregoing method, after obtaining the second user plane security policy, the session management network element may determine the second user plane security enforcement information in a plurality of manners.

In a possible design, the identifier of the third terminal device includes a part or all of the following: a temporary identifier of the third terminal device, an anonymous identifier of the third terminal device, or an SUPI of the third terminal device.

According to the foregoing method, different identifiers indicate the third terminal device, and are applicable to a plurality of scenarios.

In a possible design, the session management network element may determine the second user plane security enforcement information of the session according to the second user plane security policy in any one of the following manners:

Manner 1: The session management network element determines the second user plane security enforcement information of the session based on the second user plane security policy and the first user plane security enforcement information of the session.

Manner 2: The session management network element determines the second user plane security enforcement information of the session according to the second user plane security policy and the first user plane security policy.

Manner 3: The session management network element determines the second user plane security enforcement information of the session according only to the second user plane security policy.

According to the foregoing method, the session management network element may determine the second user plane security enforcement information in a plurality of different manners that are applicable to different application scenarios.

In a possible design, that the session management network element obtains the second user plane security policy based on the identifier of the third terminal device is similar to obtaining of the first user plane security policy.

For example, the session management network element sends a second subscription information obtaining request to the unified data management network element, where the second subscription information obtaining request includes the identifier of the third terminal device. The session management network element receives a second subscription information obtaining response from the unified data management network element, where the second subscription information obtaining response includes the second user plane security policy.

For another example, the session management network element may alternatively determine, based on the identifier of the third terminal device, the second user plane security policy in the user plane security policy to which the first terminal device subscribes.

For another example, the session management network element sends a second subscription information obtaining request to the unified data management network element, where the second subscription information obtaining request includes the identifier of the third terminal device. The session management network element receives a second subscription information obtaining response from the unified data management network element, where the second subscription information obtaining response includes the user plane security policy of the relay-type session of the first terminal device. The session management network element determines the second user plane security policy according to the user plane security policy of the relay-type session of the first terminal device.

For another example, the session management network element sends a second subscription information obtaining request to the unified data management network element, where the second subscription information obtaining request includes the identifier of the third terminal device. The session management network element receives a second subscription information obtaining response from the unified data management network element, where the second subscription information obtaining response includes a user plane security policy to which the third terminal device subscribes. The session management network element determines the second user plane security policy according to the user plane security policy to which the third terminal device subscribes.

According to the foregoing method, the session management network element may flexibly obtain the second user plane security policy, and an application scenario is effectively extended.

In a possible design, after the session management network element determines that the first user plane security enforcement information of the session is different from the second user plane security enforcement information of the session, the session management network element may send the second user plane security enforcement information of the session to the access network device. After the session management network element determines that the first user plane security enforcement information of the session is the same as the second user plane security enforcement information of the session, the session management network element may not send the second user plane security enforcement information of the session to the access network device.

According to the foregoing method, the first user plane security enforcement information of the session is compared with the second user plane security enforcement information of the session, to determine whether to send the second user plane security enforcement information of the session is determined, so that information exchange between the session management network element and the access network device can be well reduced.

In a possible design, the second user plane security policy indicates that the integrity protection of the session is preferred. The session management network element may alternatively determine the second user plane security enforcement information of the session according to the second user plane security policy with reference to the integrity protection maximum data rate of the first terminal device. For example, after determining that the integrity protection maximum data rate of the first terminal device is less than the data rate required by the session, the session management network element determines to disable the integrity protection of the session, that is, the integrity protection of the session in the second user plane security enforcement information is not needed.

According to the foregoing method, in addition to ensuring the security requirement of the third terminal device, the second user plane security enforcement information determined by the session management network element can further ensure that the first terminal device can effectively transmit data of the third terminal device by using the session.

According to a second aspect, an embodiment of this application provides a user plane security enforcement information determining method. The method includes: First, a first terminal device may send a second request to an access and mobility management network element, where the second request requests to create a relay-type session, the second request includes second information, and the second information indicates that a type of the session is a relay type. Then, the first terminal device may receive first indication information from an access network device, where the first indication information indicates a first user plane security activation status of the session between the first terminal device and the access network device. The first terminal device configures the first user plane security activation status based on the first indication information.

According to the foregoing method, when initiating a session creation procedure, the first terminal device may also indicate the session type of the session, so that a session management network element can determine user plane security enforcement information of the session.

In a possible design, the first terminal device may receive a first direct communication request sent by a second terminal device, where the first direct communication request is for establishing communication with the first terminal device. The first terminal device may determine that the relay-type session needs to be established, and send the second request. The first terminal device may create the relay-type session in advance. That is, the first terminal device may send the second request before receiving a first direct communication request of a second terminal device.

According to the foregoing method, the first terminal device may determine, in different scenarios, that the relay-type session needs to be created, and send the second request.

In a possible design, the second request may include an N1 SM container, and the N1 SM container includes the second information. In this case, the second request may be a session establishment request. The second request may alternatively include the second information and an N1 SM container. In this case, the second request includes a session establishment request (namely, the N1 SM container) and the second information.

According to the foregoing method, there are a plurality of composition forms of the second request that are applicable to different application scenarios.

In a possible design, there are many manners in which the second information indicates that the type of the session is the relay type. For example, the second information uses an explicit indication manner. For example, the second information may be a pre-agreed field or character. For another example, the second information may alternatively use an implicit indication manner. For example, the second information is an identifier of the second terminal device, and the identifier of the second terminal device is one of the following: a temporary identifier of the second terminal device, an anonymous identifier of the second terminal device, or a subscription permanent identifier SUPI of the second terminal device. In this case, the session is for transmitting data of the second terminal device.

According to the foregoing method, the second information may flexibly indicate, in different manners, that the type of the session is the relay type.

In a possible design, the first terminal device may further receive a second direct communication request sent by a third terminal device, where the second direct communication request is for establishing communication with the first terminal device. The first terminal device determines, based on the second direct communication request, that the third terminal device is to use the session, and then sends a third request, where the third request indicates that the third terminal device is to use the session, and the third request includes an identifier of the third terminal device. The third request may be a session modification request, or may be another request.

According to the foregoing method, when the third terminal device is to reuse the session, the first terminal device may notify, by sending the third request, the session management network element that the third terminal device is to reuse the session, so that the session management network element re-determines the user plane security enforcement information.

In a possible design, the identifier of the third terminal device includes one or more of the following: a temporary identifier of the third terminal device, an anonymous identifier of the third terminal device, or an SUPI of the third terminal device.

According to the foregoing method, the identifier of the third terminal device may be different types of identifiers that are applicable to different application scenarios.

In a possible design, after receiving, from the access network device, the first indication information indicating the first user plane security activation status, the first terminal device may determine a security activation status between the first terminal device and the second terminal device based on the first user plane security activation status.

According to the foregoing method, the first terminal device may configure a security activation status of a PC5 interface (a communication interface between the first terminal device and the second terminal device), to ensure security of the data of the second terminal device.

In a possible design, if integrity protection in the first user plane security activation status is required, the first terminal device may further refer to an integrity protection maximum data rate or QoS control information of the second terminal device when configuring the security activation status between the first terminal device and the second terminal device based on the first user plane security activation status, that is, determines, based on the integrity protection maximum data rate or the QoS control information of the second terminal device, whether to enable the integrity protection between the first terminal device and the second terminal device.

According to the foregoing method, in addition to ensuring the security of the data of the second terminal device, the user plane security activation status between the first terminal device and the second terminal device can also ensure that the second terminal device can effectively transmit the data to the first terminal device.

In a possible design, if the integrity protection in the first user plane security activation status is not needed, the first terminal device sends a direct communication reject message to the second terminal device when determining that a user plane security policy of the second terminal device indicates that the integrity protection is required (where the information may be carried in the first direct communication request).

According to the foregoing method, when determining that the second terminal device cannot support data transmission when the integrity protection is enabled, the first terminal device may reject establishment of direct communication, so that the security of the data of the second terminal device can be ensured.

In a possible design, the first terminal device may further receive second indication information from the access network device, where the second indication information indicates a second user plane security activation status of the session between the first terminal device and the access network device; and then update the first user plane security activation status based on the second indication information, that is, update the first user plane security activation status to the second user plane security activation status based on the second indication information.

According to the foregoing method, the first terminal device may update the user plane security activation status between the first terminal device and the access network device, to ensure security of data of the third terminal device.

In a possible design, after receiving the second indication information sent by the access network device, the first terminal device may further update the user plane security activation status between the first terminal device and the second terminal device based on the second user plane security activation status.

According to the foregoing method, the first terminal device may update a security activation status of a PC5 interface (a communication interface between the first terminal device and the third terminal device), to ensure the security of the data of the third terminal device.

In a possible design, the integrity protection in the second user plane security activation status is required. When updating the security activation status between the first terminal device and the second terminal device based on the second user plane security activation status, the first terminal device may further consider an integrity protection maximum data rate or QoS control information of the third terminal device, and determine, based on the integrity protection maximum data rate or quality of service QoS control information of the third terminal device, whether to enable the integrity protection between the first terminal device and the second terminal device.

According to the foregoing method, in addition to ensuring the security of the data of the third terminal device, a user plane security activation status between the first terminal device and the third terminal device can also ensure that the third terminal device can effectively transmit the data to the first terminal device.

According to a third aspect, an embodiment of this application provides a user plane security enforcement information determining method. The method includes: First, an access and mobility management network element receives a second request sent by a first terminal device, where the second request includes second information, the second request requests to create a relay-type session of the first terminal device, and the second information indicates that a type of the session is a relay type. Then, the access and mobility management network element sends a first request to a session management network element based on the second request, where the first request includes first information, the first information indicates that the type of the session is the relay type, and the first request requests to create the relay-type session of the first terminal device.

According to the foregoing method, after receiving the second request including the second information, the access and mobility management network element sends, to the session management network element in time, the first request including the first information, so that the session management network element can determine user plane security enforcement information of the session based on the first information.

In a possible design, the second information is the same as the first information, the first request and the second request each include an N1 SM container, and the N1 SM container includes the second information. In this case, the first request and the second request may be session establishment requests. That is, the first request is the same as the second request. The access and mobility management network element may directly transmit the first request to the session management network element.

In a possible design, the second request includes the second information and an N1 SM container, and the first request includes the first information and the N1 SM container.

According to the foregoing method, because the second information is located outside the N1 SM container, the access and mobility management network element may identify the second information, and further determine the first information that needs to be carried in the first request.

In a possible design, when sending the first request to the session management network element based on the second information, the access and mobility management network element may first determine, based on the second information, whether the first terminal device is authorized to establish the session. If the access and mobility management network element determines that the first terminal device is authorized to establish the session, the access and mobility management network element sends the first request to the session management network element; otherwise, the access and mobility management network element may directly reject establishment of the session.

According to the foregoing method, the access and mobility management network element may perform an authorization check on the first terminal device based on the second information in advance, to ensure that the session can be efficiently established subsequently.

In a possible design, the second information is a temporary identifier or an anonymous identifier of a second terminal device. The access and mobility management network element may determine an SUPI of the second terminal device based on the second information, where the SUPI of the second terminal device may be used as the first information.

According to the foregoing method, the access and mobility management network element may determine the SUPI of the second terminal device, and the first terminal device does not need to transmit the SUPI of the second terminal device, so that security of the SUPI of the second terminal device is ensured.

In a possible design, there are many manners in which the second information indicates that the type of the session is the relay type. For example, the second information uses an explicit indication manner. For example, the second information may be a pre-agreed field or character. For another example, the second information may alternatively use an implicit indication manner. For example, the second information is an identifier of a second terminal device, and the identifier of the second terminal device is one of the following: a temporary identifier of the second terminal device, an anonymous identifier of the second terminal device, or a subscription permanent identifier SUPI of the second terminal device.

According to the foregoing method, the second information may flexibly indicate, in different manners, that the type of the session is the relay type.

In a possible design, there are many manners in which the first information indicates that the type of the session is the relay type. For example, the first information uses an explicit indication manner. For example, the first information may be a pre-agreed field or character. For another example, the first information may alternatively use an implicit indication manner. For example, the first information is an identifier of the second terminal device, and the identifier of the second terminal device includes a part or all of the following: the temporary identifier of the second terminal device, the anonymous identifier of the second terminal device, or the subscription permanent identifier SUPI of the second terminal device.

According to the foregoing method, the first information may flexibly indicate, in different manners, that the type of the session is the relay type.

In a possible design, before sending the first request to the session management network element based on the second request, the access and mobility management network element may further determine, based on the second information, that the first terminal device is authorized to establish a session for the second terminal device.

According to the foregoing method, the access and mobility management network element may perform an authorization check on the second terminal device based on the second information in advance, to ensure that the first terminal device can transmit data of the second terminal device.

According to a fourth aspect, an embodiment of this application provides a user plane security enforcement information determining method. The method includes: A unified data management network element may provide a first user plane security policy for a session management network element. The following provides two manners:

Manner 1: The unified data management network element may receive a first subscription information obtaining request from the session management network element, where the first subscription information obtaining request includes first information, and the first information indicates that a type of a session is a relay type. The unified data management network element determines the first user plane security policy based on the first information. Then, the unified data management network element sends a first subscription information obtaining response to the session management network element, where the first subscription information obtaining response includes the first user plane security policy.

In the foregoing manner, the unified data management network element may directly determine the first user plane security policy, and feed back the first user plane security policy to the session management network element.

Manner 2: The unified data management network element receives a first subscription information obtaining request from the session management network element, where the first subscription information obtaining request requests a user plane security policy to which a first terminal device subscribes, and the user plane security policy to which the first terminal device subscribes indicates a user plane security policy of a relay-type session of the first terminal device and a user plane security policy of a non-relay-type session of the first terminal device. The unified data management network element sends a first subscription information obtaining response to the session management network element, where the first subscription information obtaining response includes the user plane security policy to which the first terminal device subscribes, and the user plane security policy to which the first terminal device subscribes includes the first user plane security policy.

In the foregoing manner, the unified data management network element may only need to feed back, to the session management network element, the user plane security policy to which the first terminal device subscribes, and then the session management network element may determine the first user plane security policy.

In a possible design, when the unified data management network element determines the first user plane security policy based on the first information, the unified data management network element may determine the first user plane security policy based on the first information and a user plane security policy to which a first terminal device subscribes, where the user plane security policy to which the first terminal device subscribes indicates user plane security policies of a relay-type session and a non-relay-type session of the first terminal device.

According to the foregoing method, the unified data management network element may determine, based on the first information, that the session is the relay-type session, and then may determine the first user plane security policy.

In a possible design, the first information is an identifier of a second terminal device. When the unified data management network element determines the first user plane security policy based on the first information, the unified data management network element determines, based on the identifier of the second terminal device, the first user plane security policy in a user plane security policy to which the second terminal device subscribes.

According to the foregoing method, the first user plane security policy determined according to the user plane security policy to which the second terminal device subscribes can ensure a security requirement of the second terminal device.

In a possible design, the unified data management network element receives a second subscription information obtaining request from the session management network element, where the second subscription information obtaining request includes an identifier of a third terminal device. Then, the unified data management network element determines a second user plane security policy based on the identifier of the third terminal device; and then sends a second subscription information obtaining response to the session management network element, where the second subscription information obtaining response includes the second user plane security policy.

According to the foregoing method, the unified data management network element may determine, based on the second subscription information obtaining request, that the session is the relay-type session, and then may determine the second user plane security policy.

According to a fifth aspect, an embodiment of this application further provides a communication apparatus. The communication apparatus is used in a session management network element. For beneficial effects, refer to the descriptions in the first aspect. Details are not described herein again. The apparatus has a function of implementing the behavior in the method example in the first aspect. The function may be implemented by using hardware, or may be implemented by hardware executing corresponding software. The hardware or the software includes one or more modules corresponding to the foregoing function. In a possible design, a structure of the apparatus includes a receiving unit, a processing unit, and a sending unit. These units may perform corresponding functions in the method example in the first aspect. For details, refer to the detailed descriptions in the method example. Details are not described herein again.

According to a sixth aspect, an embodiment of this application further provides a communication apparatus. The communication apparatus is used in a first terminal device. For beneficial effects, refer to the descriptions in the second aspect. Details are not described herein again. The apparatus has a function of implementing the behavior in the method example in the second aspect. The function may be implemented by using hardware, or may be implemented by hardware executing corresponding software. The hardware or the software includes one or more modules corresponding to the foregoing function. In a possible design, a structure of the apparatus includes a receiving unit and a sending unit, and optionally, further includes a processing unit. These units may perform corresponding functions in the method example in the second aspect. For details, refer to the detailed descriptions in the method example. Details are not described herein again.

According to a seventh aspect, an embodiment of this application further provides a communication apparatus. The communication apparatus is used in an access and mobility management network element. For beneficial effects, refer to the descriptions in the third aspect. Details are not described herein again. The apparatus has a function of implementing the behavior in the method example in the third aspect. The function may be implemented by using hardware, or may be implemented by hardware executing corresponding software. The hardware or the software includes one or more modules corresponding to the foregoing function. In a possible design, a structure of the apparatus includes a receiving unit and a sending unit, and optionally, further includes a processing unit. These units may perform corresponding functions in the method example in the third aspect. For details, refer to the detailed descriptions in the method example. Details are not described herein again.

According to an eighth aspect, an embodiment of this application further provides a communication apparatus. The communication apparatus is used in a unified data management network element. For beneficial effects, refer to the descriptions in the fourth aspect. Details are not described herein again. The apparatus has a function of implementing the behavior in the method example in the fourth aspect. The function may be implemented by using hardware, or may be implemented by hardware executing corresponding software. The hardware or the software includes one or more modules corresponding to the foregoing function. In a possible design, a structure of the apparatus includes a receiving unit and a sending unit, and optionally, further includes a processing unit. These units may perform corresponding functions in the method example in the fourth aspect. For details, refer to the detailed descriptions in the method example. Details are not described herein again.

According to a ninth aspect, an embodiment of this application further provides a communication apparatus. The communication apparatus is used in a session management network element. For beneficial effects, refer to the descriptions in the first aspect. Details are not described herein again. A structure of the communication apparatus includes a processor and a memory. The processor is configured to support the session management network element in performing corresponding functions in the method in the first aspect. The memory is coupled to the processor, and stores program instructions and data that are necessary for the communication apparatus. The structure of the communication apparatus further includes a communication interface configured to communicate with another device.

According to a tenth aspect, an embodiment of this application further provides a communication apparatus. The communication apparatus is used in a first terminal device. For beneficial effects, refer to the descriptions in the second aspect. Details are not described herein again. A structure of the communication apparatus includes a processor and a memory. The processor is configured to support the first terminal device in performing corresponding functions in the method in the second aspect. The memory is coupled to the processor, and stores program instructions and data that are necessary for the communication apparatus. The structure of the communication apparatus further includes a transceiver configured to communicate with another device.

According to an eleventh aspect, an embodiment of this application further provides a communication apparatus. The communication apparatus is used in an access and mobility management network element. For beneficial effects, refer to the descriptions in the third aspect. Details are not described herein again. A structure of the communication apparatus includes a processor and a memory. The processor is configured to support the access and mobility management network element in performing corresponding functions in the method in the third aspect. The memory is coupled to the processor, and stores program instructions and data that are necessary for the communication apparatus. The structure of the communication apparatus further includes a communication interface configured to communicate with another device.

According to a twelfth aspect, an embodiment of this application further provides a communication apparatus. The communication apparatus is used in a unified data management network element. For beneficial effects, refer to the descriptions in the fourth aspect. Details are not described herein again. A structure of the communication apparatus includes a processor and a memory. The processor is configured to support the unified data management network element in performing corresponding functions in the method in the fourth aspect. The memory is coupled to the processor, and stores program instructions and data that are necessary for the communication apparatus. The structure of the communication apparatus further includes a communication interface configured to communicate with another device.

According to a thirteenth aspect, an embodiment of this application further provides a communication system. For beneficial effects, refer to the descriptions in the foregoing aspects. Details are not described herein again. The communication system includes a session management network element and a unified data management network element.

The session management network element is configured to send a first subscription information obtaining request to the unified data management network element, where the first subscription information obtaining request includes a relay indication, and the relay indication requests a user plane security policy of a relay-type session of a first terminal device.

The unified data management network element is configured to: receive the first subscription information obtaining request; determine, based on first information, a first user plane security policy in a user plane security policy to which the first terminal device subscribes, where the user plane security policy to which the first terminal device subscribes includes the user plane security policy of the relay-type session of the first terminal device and a user plane security policy of a non-relay type session of the first terminal device; and send a first subscription information obtaining response to the session management network element, where the first subscription information obtaining response includes the first user plane security policy.

The session management network element is further configured to receive the first subscription information obtaining response.

In a possible design, the system further includes access and mobility management network element.

The access and mobility management network element is configured to send a first request to the session management network element, where the first request requests to establish the relay-type session for the first terminal device, the first request includes the first information, and the first information indicates that a type of the session is a relay type.

The session management network element is configured to receive the first request, where the relay indication is the first information or is determined based on the first information.

In a possible design, the session is for transmitting data of a second terminal device, the first information is an identifier of the second terminal device, and the identifier of the second terminal device includes a part or all of the following: a temporary identifier of the second terminal device, an anonymous identifier of the second terminal device, or an SUPI of the second terminal device.

In a possible design, the system further includes an access network device.

The session management network element is further configured to send first user plane security enforcement information of the session to the access network device after determining the first user plane security enforcement information of the session according to the first user plane security policy.

The access network device is configured to receive the first user plane security enforcement information of the session, and activate a first user plane security activation status of the session between the first terminal device and the access network device based on the first user plane security enforcement information of the session.

In a possible design, the system further includes the first terminal device.

The access network device is further configured to send a first indication message to the first terminal device, where the first indication message indicates the first user plane security activation status of the session between the first terminal device and the access network device.

The first terminal device is configured to: receive the first indication message, and activate the first user plane security activation status between the first terminal device and the access network device based on the first indication information; and configure a security activation status between the first terminal device and the second terminal device based on the first user plane security activation status.

In a possible design, the first terminal device is further configured to send a second request to the session management network element after determining that a third terminal device is to use the session, where the second request requests to modify the session, and the second request includes an identifier of the third terminal device.

The session management network element is further configured to obtain a second user plane security policy based on the identifier of the third terminal device, and send second user plane security enforcement information of the session to the access network device after determining the second user plane security enforcement information of the session according to the second user plane security policy.

The access network device is further configured to: receive the second user plane security enforcement information of the session, update the first user plane security activation status based on the second user plane security enforcement information of the session, and update the first user plane security activation status to a second user plane security activation status.

In a possible design, the identifier of the third terminal device includes a part or all of the following: a temporary identifier of the third terminal device, an anonymous identifier of the third terminal device, or an SUPI of the third terminal device.

In a possible design, the access network device is further configured to send a second indication message to the first terminal device, where the second indication message indicates the second user plane security activation status of the session between the first terminal device and the access network device.

The first terminal device is configured to: receive the second indication message, update the first user plane security activation status based on the second indication information, and update the first user plane security activation status to the second user plane security activation status; and update the security activation status between the first terminal device and the second terminal device based on the second user plane security activation status.

In a possible design, the first user plane security policy indicates that integrity protection is preferred. When determining the first user plane security enforcement information of the session according to the first user plane security policy, the session management network element is specifically configured to:

after determining that an integrity protection maximum data rate of the first terminal device is less than a data rate required by the session, determine to disable the integrity protection of the session.

In a possible design, if the first user plane security policy indicates that the integrity protection is required, the session management network element is further configured to: send a session establishment reject response to the first terminal device after determining that the integrity protection maximum data rate of the first terminal device is less than the data rate required by the session, where the session establishment reject response indicates rejection of session establishment.

In a possible design, when determining the second user plane security enforcement information of the session according to the second user plane security policy, the session management network element is specifically configured to: determine the second user plane security enforcement information of the session based on the second user plane security policy and the first user plane security enforcement information of the session; or determine the second user plane security enforcement information of the session according to the second user plane security policy and the first user plane security policy.

In a possible design, when obtaining the second user plane security policy based on the identifier of the third terminal device, the session management network element is specifically configured to: send a second subscription information obtaining request to the unified data management network element, where the second subscription information obtaining request includes the identifier of the third terminal device.

The unified data management network element is configured to: receive the second subscription information obtaining request, and determine the second user plane security policy based on the identifier of the third terminal device; and send the second user plane security policy to the session management network element.

The session management network element further receives the second user plane security policy from the unified data management network element.

In a possible design, before sending the second user plane security enforcement information of the session to the access network device, the session management network element is further configured to: determine that the first user plane security enforcement information of the session is different from the second user plane security enforcement information of the session.

In a possible design, the second user plane security policy indicates that the integrity protection of the session is preferred. When determining the second user plane security enforcement information of the session according to the second user plane security policy, the session management network element is specifically configured to: after determining that the integrity protection maximum data rate of the first terminal device is less than the data rate required by the session, determine to disable the integrity protection of the session.

According to a fourteenth aspect, this application further provides a computer-readable storage medium. The computer-readable storage medium stores instructions. When the instructions are run on a computer, the computer is enabled to perform the methods in the foregoing aspects.

According to a fifteenth aspect, this application further provides a computer program product including instructions. When the computer program product runs on a computer, the computer is enabled to perform the methods in the foregoing aspects.

According to a sixteenth aspect, this application further provides a computer chip. The chip is connected to a memory. The chip is configured to read and execute a software program stored in the memory, to perform the methods in the foregoing aspects.

BRIEF DESCRIPTION OF THE DRAWINGS

FIG. 4A and FIG. 4B are a schematic diagram of a user plane security enforcement information determining method according to an embodiment of this application;

FIG. 5A and FIG. 5B are a schematic diagram of a user plane security enforcement information determining method according to an embodiment of this application;

FIG. 6A and FIG. 6B are a schematic diagram of a user plane security enforcement information determining method according to an embodiment of this application.

DETAILED DESCRIPTION OF ILLUSTRATIVE EMBODIMENTS

Figure 1:
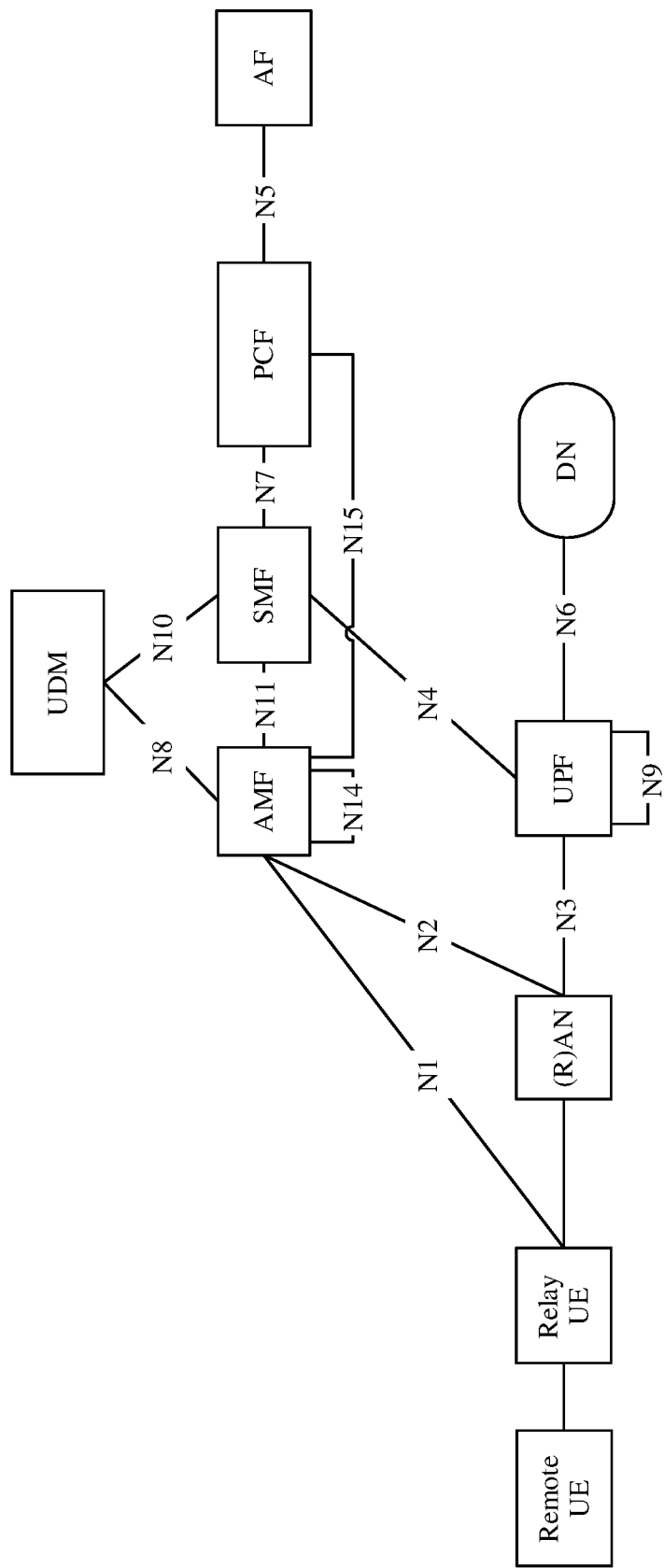
FIG. 1 is a diagram of an architecture of a system according to an embodiment of this application.

FIG. 1 is a schematic diagram of a specific network architecture to which this application is applicable. The network architecture is a network architecture of a 5G system. A network element in the 5G architecture includes a terminal device (user equipment, UE). The network architecture further includes a radio access network (RAN), an access and mobility management function (AMF) network element, a session management function (SMF) network element, a user plane function (UPF) network element, a unified data management (UDM) network element, an application function (AF) network element, a data network (DN), and the like.

The terminal device is a device having a wireless transceiver function, may be deployed on land, and includes an indoor or outdoor device, a handheld device, or a vehicle-mounted device; may be deployed on water (for example, on a ship); or may be deployed in the air (for example, on an airplane, a balloon, and a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. In embodiments of this application, terminal devices may be classified into two types: a remote UE (for example, a second terminal device and a third terminal device) and a relay UE (for example, a first terminal device). The remote UE is a UE that needs to communicate with a data network by using the relay UE, and the relay UE is a UE that can directly communicate with the data network.

In embodiments of this application, the remote UE may send a direct communication request (for example, a first direct communication request and a second direct communication request) to the relay UE, where the direct communication request is for establishing a PC5 interface communication connection to the relay UE. The relay UE may initiate a session establishment procedure to the SMF network element, where the session establishment procedure is for establishing a session for transmitting data between the remote UE and the DN (where the session is essentially a session established by the relay UE with a network through an access network, is for transmitting data exchanged between the remote UE and the data network, and may also be referred to as a relay session). When initiating the session establishment procedure, the relay UE may directly send, to the SMF network element, an identifier of the remote UE or indication information indicating that the established session is the relay session. When initiating the session establishment procedure, the relay UE may alternatively send an identifier of the remote UE or indication information to the SMF network element by using the AMF network element.

A main function of the RAN is controlling the terminal device to access a mobile communication network in a wireless manner. The RAN is a part of a mobile telecommunication system. The RAN implements a radio access technology. Conceptually, the RAN resides between a device (for example, a mobile phone, a computer, or any remotely controlled machine) and provides a connection to a core network of the RAN.

The AMF network element is responsible for access management and mobility management of the terminal. During actual application, the AMF network element has a mobility management function of an MME in an LTE network architecture, and adds an access management function.

The SMF network element is responsible for session management such as user session establishment, modification, or deletion. In embodiments of this application, the SMF network element may determine, based on the identifier of the remote UE or the indication information, that the session created by the relay UE is the relay session, obtain a user plane security policy of the relay session from the UDM network element, and determine, according to the user plane security policy of the relay session, user plane security enforcement information that is of the session and that is required by the RAN.

The UPF network element is a user-plane function network element, and is mainly responsible for connecting to an external network. The UPF network element has related functions of a serving gateway (SGW) and a public data network gateway (PDN-GW) in LTE.

The DN is responsible for providing a service for the terminal. For example, some DNs provide a network access function for the terminal, and some other DNs provide a short message service function for the terminal.

The UDM network element may store subscription information of a user, and implementation is similar to that of an HSS in 4G. In embodiments of this application, the UDM network element can determine a subscription permanent identifier (SUPI) of the terminal device based on an anonymous identifier or a temporary identifier of the remote UE. The UDM network element further stores a user plane security policy to which the relay UE subscribes. The user plane security policy to which the relay UE subscribes includes the user plane security policy of the relay session. After receiving a subscription information obtaining request of the SMF network element, the UDM network element feeds back the user plane security policy of the relay session to the SMF network element.

The AF network element may be a third-party application server, or may be a device deployed by a carrier, for example, a proxy-call session control function (P-CSCF). The AF network element may provide services for a plurality of application servers.

Although not shown, a core network element further includes a unified data repository (UDR) network element and a subscription identifier de-concealing function (SIDF) network element. The UDR network element is mainly configured to store user-related subscription data, policy data (for example, a user plane security policy to which the UE subscribes), structured data for exposure, and application data. In embodiments of this application, the SIDF network element can parse an anonymous identifier (SUCI) of the UE to obtain an SUPI. The SIDF network element may be deployed independently or co-deployed with another network element. For example, the SIDF network element may be co-deployed with the UDM network element.

In embodiments of this application, when determining that a relay session needs to be created, a relay UE may initiate a session establishment procedure to a session management network element, where the session establishment procedure is for establishing the relay-type session; and send, to the session management network element in the session establishment procedure, first information indicating that a type of the session is a relay type. The session management network element determines a first user plane security policy based on the first information, determines first user plane security enforcement information of the session according to the first user plane security policy, and sends the first user plane security enforcement information of the session to an access network device. The access network device may determine a first user plane security activation status by using the first user plane security enforcement information of the session. The first user plane security activation status indicates that user plane integrity protection and encryption protection between the relay UE and the access network device are enabled or disabled. In embodiments of this application, the session management network element can obtain a user plane security policy of the relay-type session by receiving the first information, thereby determining user plane security enforcement information of the session, so that the security activation status determined by the access network based on the user plane security enforcement information of the session can satisfy a security requirement of the remote UE.

With reference to the accompanying drawings, the following describes a user plane security policy determining method provided in embodiments of this application. There are two manners of a user plane security activation status determining method in embodiments of this application. One manner is as follows: Participation of an access and mobility management network element is not needed, and a session management network element determines user plane security of a session based on an identifier of a second terminal device or indication information. The other manner is as follows: An access and mobility management network element participates, the access and mobility management network element needs to perform further processing based on information sent by a first terminal device, then determines, obtains, or generates indication information, and sends the indication information to a session management network element, and then the session management network element determines a user plane security policy of a session based on the information. The following separately describes the two manners.

Figure 2:
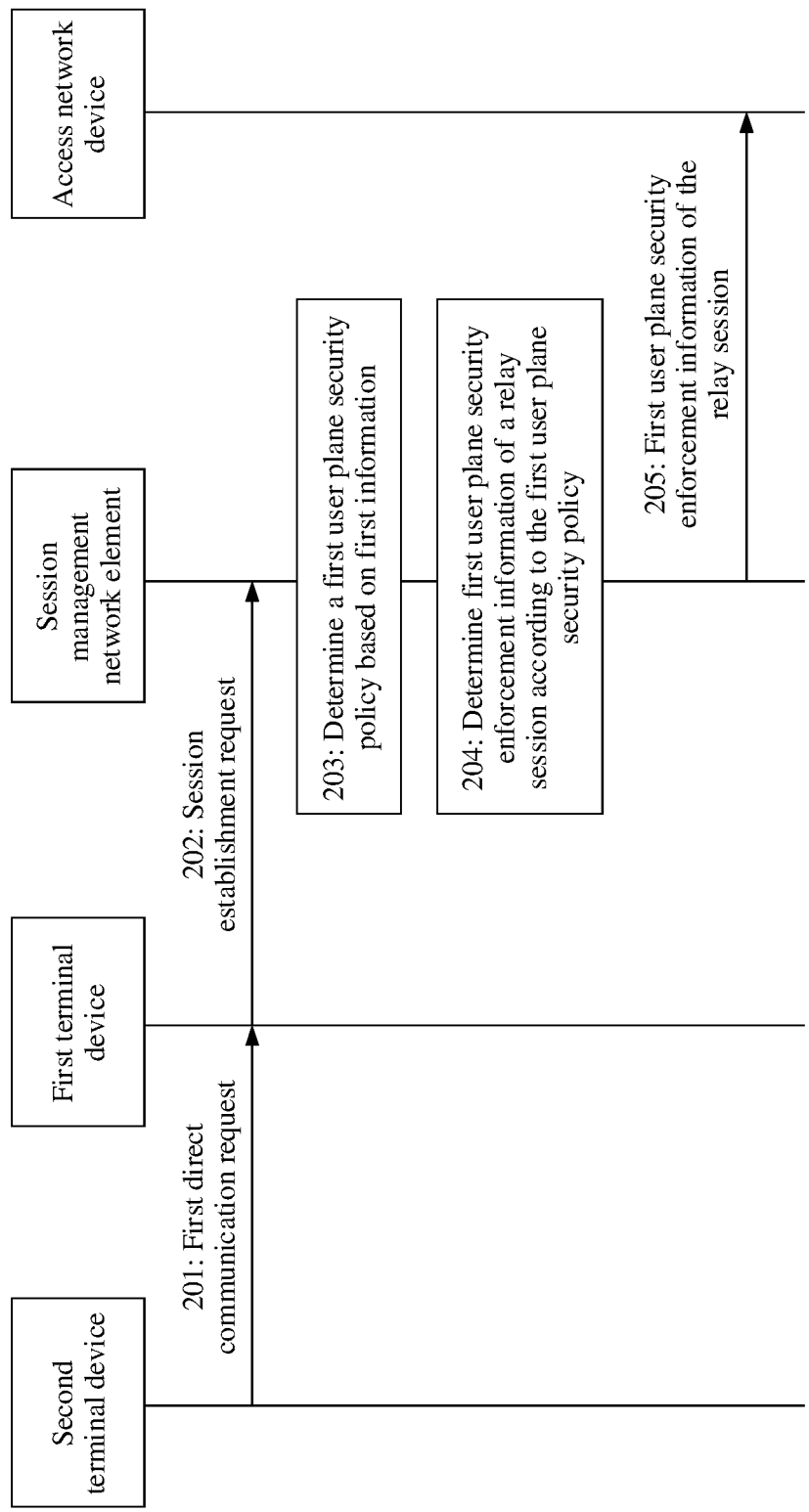
FIG. 2 is a schematic diagram of a user plane security enforcement information determining method according to an embodiment of this application.

In a first manner, FIG. 2 shows a user plane security enforcement information determining method according to an embodiment of this application. The method includes the following steps.

Step 201: A second terminal device sends a first direct communication request to a first terminal device, where the first direct communication request requests to establish a communication connection to the first terminal device, and the first direct communication request may include an identifier of the second terminal device.

The identifier of the second terminal device includes but is not limited to a temporary identifier, an anonymous identifier, and a subscription permanent identifier (SUPI) that are of the second terminal device.

The temporary identifier is an identifier pre-allocated to the second terminal device. The anonymous identifier may conceal a permanent identifier of the terminal device, and only a specific network element may obtain, by using the anonymous identifier, the permanent identifier that is of the terminal device and that is concealed in the anonymous identifier. For example, the anonymous identifier may be a subscription concealed identifier (SUCI), and the SUCI is a privacy protection identifier including the SUPI.

Step 202: After receiving the first direct communication request, the first terminal device determines that a session for transmitting data of the second terminal device needs to be created, that is, a relay-type session of the first terminal device needs to be created. The first terminal device sends a session establishment request to a session management network element, where the session establishment request requests to create the relay-type session of the first terminal device, and the session establishment request may include a session identifier. The session created in embodiments of this application may be a PDU session.

It should be noted that, in embodiments of this application, the relay-type session may also be referred to as a relay session. The relay session is a session that is established by the first terminal device serving as a relay UE and that is for supporting data transmission between a remote UE and a data network. Correspondingly, in addition to the relay-type session of the first terminal device, there is a non-relay-type session of the first terminal device. In embodiments of this application, the non-relay-type session may also be referred to as a non-relay session. The non-relay session is a session that is established by the first terminal device and that is for supporting data transmission between the first terminal device and the data network.

To notify the session management network element that the session that the first terminal device requests to create is the relay session, the first terminal device may include first information in the session establishment request, where the first information indicates that a type of the session is a relay type.

A manner in which the first information indicates that the type of the session is the relay type is not limited in embodiments of this application. For example, the first information may use an explicit indication manner, and the first information may be a pre-agreed field or character. For another example, the first information may use an implicit indication manner, and the first information may be the identifier of the second terminal device.

When sending the session establishment request to the session management network element, the first terminal device may first send the session establishment request to an access and mobility management network element. After receiving the session establishment request, the access and mobility management network element forwards the session establishment request to the session management network element.

Further, the first terminal device sends the session establishment request to the access and mobility management network element via a NAS message. The NAS message further includes a data network name (DNN) and/or single network slice selection assistance information (single-network slice selection assistance information, S-NSSAI). In other words, the session establishment request is included in an N1 SM container.

Step 203: After receiving the session establishment request, the session management network element determines a first user plane security policy based on the first information.

Step 204: After obtaining the first user plane security policy, the session management network element may determine first user plane security enforcement information of the relay session according to the first user plane security policy, where the first user plane security enforcement information of the relay session can be for determining a first user plane security activation status of the session between the first terminal device and an access network device.

It should be noted that the first user plane security activation status of the session between the first terminal device and the access network device is essentially a first user plane security activation status of a communication interface between the first terminal device and the access network device. For ease of description, the communication interface between the first terminal device and the access network device is referred to as a first interface.

Step 205: After determining the first user plane security enforcement information of the relay session, the session management network element may send the first user plane security enforcement information of the relay session to the access network device.

A manner in which the session management network element determines the first user plane security policy based on the first information is not limited in this embodiment of this application. The following lists four manners.

(i) The session management network element obtains subscription information of the first terminal device, where the subscription information of the first terminal device includes relay identification information and a user plane security policy to which the first terminal device subscribes, and the relay identification information indicates that the first terminal device is authorized to establish the relay-type session, that is, whether the first terminal device is allowed to serve as a relay device.

The user plane security policy to which the first terminal device subscribes includes a user plane security policy used when the first terminal device is allowed to serve as the relay device. The user plane security policy used when the first terminal device is allowed to serve as the relay device includes a user plane security policy of the relay session of the first terminal device. Optionally, the user plane security policy used when the first terminal device is allowed to serve as the relay device further includes a user plane security policy that is of the non-relay session and that is used when the first terminal device is allowed to serve as the relay device, namely, a user plane security policy of the non-relay session of the first terminal device.

Optionally, the user plane security policy to which the first terminal device subscribes may further include a user plane security policy used when the first terminal device does not serve as the relay device.

Both the user plane security policy that is of the non-relay session and that is used when the first terminal device is allowed to serve as the relay device and the user plane security policy used when the first terminal device does not serve as the relay device belong to the user plane security policy of the non-relay session of the first terminal device. A difference lies in whether the first terminal device is allowed to serve as the relay device.

There are many manners in which the user plane security policy to which the first terminal device subscribes identifies the user plane security policy used when the first terminal device is allowed to serve as the relay device and the user plane security policy used when the first terminal device is not allowed to serve as the relay device. For example, the user plane security policies may be identified explicitly by using the relay identification information or identified by using the relay session and the non-relay session. In a manner in which the user plane security policies are identified by using the relay session and the non-relay session, because the relay session and the non-relay session are distinguished, it indicates that the first terminal device is allowed to serve as the relay device.

The following lists several user plane security policies to which the first terminal device subscribes. Refer to Table 1 and Table 2.

TABLE 1

| Subscription information of a first terminal device (a user plane security policy to which the first terminal device subscribes) | DNN of a data network 1 and S-NSSAI 1 Relay identification information User plane security policy 1 DNN of a data network 2 and S-NSSAI 2 User plane security policy 2 |
|---|---|

The user plane security policy 1 is a user plane security policy identified by using the relay identification information, and is the user plane security policy used when the first terminal device serves as the relay device. The user plane security policy 2 is the user plane security policy used when the first terminal device does not serve as the relay device. The user plane security policy 1 may be used as the user plane security policy of the relay session of the first terminal device, and the user plane security policy 2 may be used as the user plane security policy of the non-relay session of the first terminal device. It should be noted herein that, because the relay session and the non-relay session are not distinguished for the user plane security policy 1, in other words, when a data network of the non-relay session of the first terminal device is the data network 1, the user plane security policy 1 may also be selected as a user plane security policy.

TABLE 2

| Subscription information of a first terminal device (a user plane security policy to which the first terminal device subscribes) | DNN of a data network 1 and S-NSSAI 1 Relay identification information |  |
|---|---|---|
|  | Relay session | User plane security policy 1 |
|  | Non-relay session | User plane security policy 2 |
|  | DNN of a data network 2 and S-NSSAI 2 |  |
|  | Relay session | User plane security policy 3 |
|  | Non-relay session | User plane security policy 4 |
|  | DNN of a data network 3 and S-NSSAI User plane security policy 5 |  |

The user plane security policy 1 and the user plane security policy 2 are user plane security policies identified by using the relay identification information, and the user plane security policy 5 is the user plane security policy used when the first terminal device does not serve as the relay device. Although the user plane security policy 3 and the user plane security policy 4 do not carry the relay identification information, the relay session and the non-relay session are distinguished for the user plane security policy 3 and the user plane security policy 4. In other words, the first terminal device may serve as the relay device, that the first terminal device is allowed to serve as the relay UE is indicated in an implicit manner, and the user plane security policy 3 is essentially a user plane security policy used when the first terminal device serves as the relay device.

The user plane security policy 1 and the user plane security policy 3 are user plane security policies of the relay session of the first terminal device, and the user plane security policy 2, the user plane security policy 4, and the user plane security policy 5 are user plane security policies of the non-relay session of the first terminal device.

It should be noted that, in the user plane security policy to which the first terminal device subscribes, the user plane security policy used when the first terminal device is allowed to serve as the relay device and the user plane security policy used when the first terminal device does not serve as the relay device may alternatively be distinguished. Only the relay identification information is added to the subscription information, and indicates that the first terminal device is authorized to establish the relay-type session, that is, the first terminal device may serve as the relay device. The session management network element may select a corresponding user plane security policy based on the DNN and/or the S-NSSAI corresponding to the session.

(2) The session management network element obtains subscription information (including a user plane security policy to which the first terminal device subscribes) of the first terminal device, and the session management network element determines the first user plane security policy based on the first information and the user plane security policy to which the first terminal device subscribes.

The user plane security policy to which the first terminal device subscribes is a subscribed user plane security policy preconfigured by a carrier network for the first terminal device. The user plane security policy to which the first terminal device subscribes may include a user plane security policy of the relay-type session of the first terminal device, and may further include a user plane security policy of the non-relay-type session.

In this embodiment of this application, the user plane security policy to which the first terminal device subscribes includes the first user plane security policy and/or a second user plane security policy, and may further include the user plane security policy of the non-relay session.

For example, information included in the user plane security policy to which the first terminal device subscribes is shown in Table 3.

TABLE 3

| Subscription information of a first terminal device (a user plane security policy to which the first terminal device subscribes) | DNN of a data network 1 and S-NSSAI 1 | |
|---|---|---|
| | Relay session | User plane security policy 1 |
| | Non-relay session | User plane security policy 2 |
| | DNN of a data network 2 and S-NSSAI 2 | |
| | Relay session | User plane security policy 3 |
| | Non-relay session | User plane security policy 4 |
| | DNN of a data network 3 and S-NSSAI User plane security policy | |

Optionally, the user plane security policy to which the first terminal device subscribes may further include the identifier of the second terminal device. The identifier of the second terminal device indicates a terminal device to which data that needs to be transmitted by using the relay session belongs.

It can be learned from Table 1 that the user plane security policy to which the first terminal device subscribes includes user plane security policies that are used when sessions established with one or more data networks are the relay session or the non-relay session and that are of the sessions. The data network may be indicated by using the DNN of the data network. Optionally, the user plane security policy to which the first terminal device subscribes may further include the single network slice selection assistance information (single-network slice selection assistance information, S-NSSAI) that identifies or indicates a network slice.

Information included in a user plane security policy is described herein. The user plane security policy indicates whether to enable encryption protection and integrity protection. Specifically, the user plane security policy includes a user plane encryption protection policy (indicating whether to enable the encryption protection) and a user plane integrity protection policy (indicating whether to enable the integrity protection). There are three possible values of the user plane encryption protection policy: not needed, preferred, and required. There are three possible values of the user plane integrity protection policy: not needed, preferred, and required. Not needed indicates that the policy does not need to be enabled, preferred indicates that the policy may be enabled or may not be disabled, and required indicates that the policy needs to be enabled. The foregoing three possible values each may be indicated by using two bits. For example, 00 indicates that the policy does not need to be enabled, 01 indicates that the policy may be enabled or may not be enabled, and ii indicates that the policy needs to be enabled. A specific manner in which the three possible values are indicated for the user plane encryption protection policy and the user plane integrity protection policy is not limited in this embodiment of this application.

User plane encryption protection is protection of confidentiality of data during transmission (therefore, the user plane encryption protection may also be referred to as user plane confidentiality protection). The confidentiality means that real content of the transmitted data cannot be directly learned of. User plane integrity protection is protection of integrity of data during transmission on a user plane. The integrity means that the data is original and has not been tampered with.

In this embodiment of this application, the user plane security policy to which the first terminal device subscribes may be locally stored by the session management network element, or may be obtained by the session management network element from a unified data management network element. For example, after receiving the session establishment request, the session management network element may obtain, from the unified data management network element, the user plane security policy to which the first terminal device subscribes.

For example, the session management network element may send a first subscription information obtaining request to the unified data management network element. The first subscription information obtaining request may carry a relay indication, and the relay indication requests the user plane security policy of the relay-type session of the first terminal device. The relay indication may be the first information, or may be determined based on the first information.

For example, when the first information is the identifier of the second terminal device, the relay indication may indicate, in an explicit indication manner, that the type of the session is the relay type, to request the user plane security policy of the relay-type session of the first terminal device. After receiving the first subscription information obtaining request, the unified data management network element may directly determine, based on the relay indication, that the user plane security policy of the relay-type session of the first terminal device needs to be fed back.

Then, the unified data management network element sends a first subscription information obtaining response to the session management network element, where the first subscription information obtaining response includes the user plane security policy to which the first terminal device subscribes. The session management network element receives the first subscription information obtaining response from the unified data management network element.

The session management network element selects, as the first user plane security policy based on the first information carried in the session establishment request, a corresponding user plane security policy from the user plane security policy to which the first terminal device subscribes. That is, the user plane security policy of the relay-type session is selected as the first user plane security policy.

When obtaining, from the unified data management network element, the user plane security policy to which the first terminal device subscribes, the session management network element may alternatively obtain only a part of the user plane security policy to which the first terminal device subscribes, for example, obtain only the user plane security policy of the relay session of the first terminal device.

That the session management network element may send a first subscription information obtaining request to the unified data management network element is still used as an example. The session management network element sends the first subscription information obtaining request to the unified data management network element, where the first subscription information obtaining request requests the user plane security policy to which the first terminal device subscribes, and the first subscription information obtaining request includes the first information (where the first subscription information obtaining request may alternatively include a relay indication).

After receiving the first subscription information obtaining request, the unified data management network element may determine, based on the first information, the user plane security policy of the relay session of the first terminal device in the user plane security policy to which the first terminal device subscribes.

The unified data management network element sends a first subscription information obtaining response to the session management network element, where the first subscription information obtaining response includes the user plane security policy of the relay session of the first terminal device.

The session management network element determines, based on the first information carried in the session establishment request, whether the session is the relay session. If the session is the relay session, the session management network element may select, from the user plane security policy of the relay session of the first terminal device, a user plane security policy as the first user plane security policy.

Optionally, the session management network element may alternatively determine, based on the first information carried in the session establishment request, whether the session is the relay session. If the session is the relay session, the session management network element may directly request the first user plane security policy from the unified data management network element. In other words, the session management network element may send, to the unified data management network element, a request message requesting the user plane security policy of the session whose session type is the relay type. After receiving the request message, the unified data management network element determines the first user plane security policy in the user plane security policy of the relay session, and feeds back the first user plane security policy to the session management network element.

The foregoing illustrates an example in which the session management network element obtains, from the unified data management network element, the user plane security policy to which the first terminal device subscribes. Actually, the session management network element may alternatively obtain, from the unified data management network element by using the first information, a user plane security policy to which the second terminal device subscribes. To be specific, after the unified data management network element receives the first subscription information obtaining request including the first information, if the first information is the identifier of the second terminal device, the unified data management network element determines, based on the first information, the user plane security policy to which the second terminal device subscribes, and includes the user plane security policy to which the second terminal device subscribes in the first subscription information obtaining request. The session management network element determines the first user plane security policy according to the user plane security policy to which the second terminal device subscribes.

In a possible implementation, the session management network element may locally store user plane security policy at a DNN granularity and/or an S-NSSAI granularity. The user plane security policy at the DNN granularity and/or the user plane security policy at the S-NSSAI granularity include/includes a user plane security policy of the relay session corresponding to the DNN and/or the S-NSSAI and/or a user plane security policy of the non-relay session corresponding to the DNN and/or the S-NSSAI. The session management network element may select the corresponding user plane security policy based on the DNN and/or the S-NSSAI corresponding to the session.

(3) The first information is the anonymous identifier or the temporary identifier of the second terminal device. The session management network element first determines the subscription permanent identifier of the second terminal device, then obtains a user plane security policy of the relay-type session of the first terminal device from a unified data management network element, and then determines the first user plane security policy based on the first information.

The session management network element may first obtain the subscription permanent identifier of the second terminal device from the unified data management network element based on the first information.

For example, the session management network element may send, to the unified data management network element, a request message carrying the first information, where the request message requests to obtain the subscription permanent identifier of the second terminal device. After receiving the request message, the unified data management network element may obtain the subscription permanent identifier of the second terminal device based on the request message, and then feed back, to the session management network element, a response message carrying the subscription permanent identifier of the second terminal device. The request message may be a newly added message, or may be a message that the session management network element needs to send to the unified data management network element in an existing interaction procedure.

A manner in which the unified data management network element obtains the subscription permanent identifier of the second terminal device based on the first message is not limited in this embodiment of this application. For example, the unified data management network element may store a correspondence between the temporary identifier and the subscription permanent identifier that are of the second terminal device or a correspondence between the anonymous identifier and the subscription permanent identifier that are of the second terminal device. After obtaining the first information, the unified data management network element may determine the subscription permanent identifier of the second terminal device based on the first information and the stored correspondence. For another example, the unified data management network element may alternatively have an identifier parsing capability, and can parse the anonymous identifier of the second terminal device into the subscription permanent identifier of the second terminal device. For another example, the unified data management network element may alternatively obtain the subscription permanent identifier of the second terminal device by interacting with an identifier parsing network element (for example, an SIDF network element). For example, the unified data management network element sends the anonymous identifier of the second terminal device to the identifier parsing network element, and obtains the subscription permanent identifier of the second terminal device from the identifier parsing network element.

After obtaining the subscription permanent identifier of the second terminal device, the session management network element may obtain the user plane security policy of the relay-type session of the first terminal device from the unified data management network element based on the subscription permanent identifier of the second terminal device.

For example, the session management network element may send, to the unified data management network element, a first subscription information obtaining request that carries the subscription permanent identifier of the second terminal device, where the first subscription information obtaining request requests to obtain the user plane security policy of the relay-type session of the first terminal device. Optionally, the first subscription information obtaining request may further include the DNN and/or the S-NSSAI. After receiving the first subscription information obtaining request, the unified data management network element determines, based on the subscription permanent identifier of the second terminal device, that the session is the relay session, and then determines, in a user plane security policy to which the first terminal device subscribes, the user plane security policy of the relay-type session of the first terminal device. Then, the unified data management network element feeds back, to the session management network element, a first subscription information obtaining response that carries the user plane security policy of the relay-type session of the first terminal device. The session management network element receives the user plane security policy of the relay-type session of the first terminal device from the unified data management network element.

In a possible implementation, after receiving the first subscription information obtaining request that carries the subscription permanent identifier of the second terminal device, the unified data management network element may alternatively determine, based on the subscription permanent identifier of the second terminal device, a user plane security policy to which the second terminal device subscribes, and uses the user plane security policy to which the second terminal device subscribes as the first user plane security policy. If the user plane security policy to which the second terminal device subscribes includes a plurality of user plane security policies, the unified data management network element may select one of the user plane security policies as the first user plane security policy. For example, the unified data management network element may determine the first user plane security policy in the plurality of user plane security policies based on the DNN and/or the S-NSSAI, and then feed back the first user plane security policy to the session management network element. The user plane security policy to which the second terminal device subscribes is a subscribed user plane security policy preconfigured by a carrier network for the second terminal device.

It should be noted that information indicated by the user plane security policy to which the second terminal device subscribes may be similar to information indicated by the user plane security policy to which the first terminal device subscribes. In other words, the user plane security policy to which the second terminal device subscribes may indicate a user plane security policy that is of a relay session and that is used when the second terminal device serves as the remote UE to access a network by using the relay UE, and may further indicate a user plane security policy that is of a non-relay session and that is used when the second terminal device directly creates a session. When determining the first user plane security policy, the unified data management network element may determine the first user plane security policy according to the user plane security policy that is of the relay session and that is used when the second terminal device serves as the remote UE to access the network by using the relay UE.

(4) The session management network element directly obtains the first user plane security policy from a unified data management network element.

The session management network element may directly send, to the unified data management network element, a first subscription information obtaining request carrying the first information, where the first subscription information obtaining request requests obtain the first user plane security policy. Optionally, the first subscription information obtaining request may further include the DNN and/or the S-NSSAI, and is used by the unified data management network element to obtain subscription information corresponding to the DNN and/or the S-NSSAI, where the subscription information includes a corresponding user plane security policy.

Herein, that the first subscription information obtaining request carries the first information is used as an example. During actual application, the session management network element may alternatively determine relay indication information based on the first information. The relay indication information may indicate that the type of the session is the relay type. In other words, the session management network element generates a relay indication based on the first information, and includes the relay indication in the first subscription information obtaining request. The first information and the relay indication may indicate, in different manners, that the type of the session is the relay type. In a possible implementation, the relay indication may alternatively be the same as the first information. That is, the session management network element includes the first information in the first subscription information obtaining request.

After the unified data management network element receives the first subscription information obtaining request, the unified data management network element may determine, based on the first information, that subscription information of the relay-type session needs to be obtained, that is, determine the first user plane security policy.

When determining the first user plane security policy, the unified data management network element may obtain the first user plane security policy from a user plane security policy to which the first terminal device subscribes.

If the first information is the identifier of the second terminal device, the unified data management network element may alternatively provide the session management network element with a user plane security policy to which the second terminal device subscribes, and the session management network element uses the user plane security policy to which the second terminal device subscribes as the first user plane security policy. Further, if subscription information of the second terminal device may include a user plane security policy that is of a relay session and that is used when the second terminal device serves as the remote UE to access a network by using the relay UE, the unified data management network element may provide the session management network element with the user plane security policy as the first user plane security policy.

For example, the first information is the temporary identifier or the anonymous identifier of the second terminal device. The unified data management network element may determine the subscription permanent identifier of the second terminal device based on the temporary identifier or the anonymous identifier of the second terminal device. Then, the unified data management network element obtains, based on the subscription permanent identifier of the second terminal device, the user plane security policy to which the second terminal device subscribes, and provides the session management network element with the user plane security policy to which the second terminal device subscribes. The session management network element uses, as the first user plane security policy, the user plane security policy to which the second terminal device subscribes.

After determining the first user plane security policy, the unified data management network element feeds back, to the session management network element, a first subscription information obtaining response that carries the first user plane security policy. The session management network element receives the first user plane security policy from the unified data management network element.

It should be noted that, in the foregoing several possible implementations, information exchanged between the session management network element and the unified data management network element is uniformly named the first subscription information obtaining request and the first subscription information obtaining response. However, the first subscription information obtaining request and the first subscription information obtaining response each may carry different information in different implementations.

The first user plane security enforcement information that is of the relay session and that is determined in step 204 is similar to the first user plane security policy, and may indicate whether to enable the encryption protection and the integrity protection between the first terminal device and the access network device in the relay session. Values of the encryption protection and the integrity protection are similar to the values of the user plane encryption protection policy and the user plane integrity protection policy in the foregoing descriptions. For details, refer to the foregoing content. Details are not described herein again. When performing step 204, the session management network element may directly use the first user plane security policy as the first user plane security enforcement information of the relay session. For example, if the first user plane security policy indicates that the user plane encryption protection policy is required and the user plane integrity protection policy is not needed, the first user plane security enforcement information of the relay session indicates that the encryption protection of the first interface is required and the integrity protection of the first interface is not needed. Alternatively, the session management network element may analyze information about the first terminal device. The information about the first terminal device includes but is not limited to an integrity protection maximum data rate of the first terminal device and quality of service (QoS) control information (for example, a data rate required by the relay session of the first terminal device) of the first terminal device. After analyzing the information about the first terminal device, the session management network element determines to use the first user plane security policy as the first user plane security enforcement information of the relay session. The session management network element may further modify the first user plane security policy after analyzing the information about the first terminal device, to determine the first user plane security enforcement information of the relay session.

For example, if the first user plane security policy indicates that the user plane encryption protection policy is preferred, the session management network element needs to further determine whether to enable the encryption protection of the first interface, and then determine the first user plane security enforcement information of the relay session.

For another example, the first user plane security policy indicates that both the user plane encryption protection policy and the user plane integrity protection policy are preferred, and the session management network element needs to further determine whether to enable the encryption protection and the integrity protection of the first interface.

There are many manners in which the session management network element further determines the first user plane security enforcement information of the relay session. This is not limited in this embodiment of this application. For example, the session management network element may determine the first user plane security enforcement information of the relay session based on the integrity protection maximum data rate of the first terminal device.

The integrity protection maximum data rate of the first terminal device indicates a data transmission rate supported by the first terminal device after the integrity protection is enabled. If the first user plane security policy indicates that the user plane integrity protection policy is preferred, the session management network element determines whether the data transmission rate supported by the first terminal device after the integrity protection is enabled can satisfy the data rate required by the relay session. The data rate required by the relay session is determined by the session management network element based on the DNN and/or the S-NSSAI of the session and/or another parameter for determining the data rate. The data rate required by the relay session may be obtained by the session management network element from the unified data management network element or a policy control network element (for example, a PCF network element), or may be obtained based on a local configuration.

If the data transmission rate supported by the first terminal device after the integrity protection is enabled is less than the data rate required by the relay session, the session management network element may determine that the integrity protection in the user plane security enforcement information is not needed, that is, the integrity protection of the first interface is disabled.

If the data transmission rate supported by the first terminal device after the integrity protection is enabled is not less than the data rate required by the relay session, the session management network element may determine that the integrity protection in the user plane security enforcement information is required, that is, the integrity protection of the first interface is enabled.

After determining the first user plane security enforcement information of the relay session, the session management network element may create the relay session, and perform step 205.

It should be noted that the session management network element may alternatively reject, based on the integrity protection maximum data rate of the first terminal device, establishment of the relay session. For example, the first user plane security policy indicates that the user plane integrity protection policy is enabled. If the integrity protection maximum data rate of the first terminal device is less than the data rate required by the relay session, in other words, after the integrity protection is enabled, the first terminal device cannot transmit data based on the data rate required by the relay session. The session management network element may reject establishment of the relay session, and send a session establishment rejection response to the first terminal device.

After receiving the first user plane security enforcement information of the relay session, the access network device may configure the first user plane security activation status of the first interface, where the first user plane security activation status indicates whether the encryption protection and the integrity protection are enabled between the first terminal device and the access network device in the relay session; and send, to the first terminal device, indication information indicating the first user plane security activation status of the first interface, to notify the first terminal device whether the encryption protection and the integrity protection are enabled on the first interface.

It should be noted that the encryption protection in the first user plane security activation status has only two states: One is enabled and the other one is disabled. The integrity protection in the first user plane security activation status also has only two states: One is enabled and the other one is disabled. The first user plane security activation status is a finally determined user plane security activation status of the first interface.

After receiving the indication information indicating the first user plane security activation status of the first interface, the first terminal device may determine a security activation status between the first terminal device and the second terminal device based on the first user plane security activation status of the first interface. The security activation status between the first terminal device and the second terminal device indicates whether the encryption protection and the integrity protection are enabled when the first terminal device and the second terminal device perform data transmission.

It should be noted that the security activation status between the first terminal device and the second terminal device is essentially a security activation status of a communication interface between the first terminal device and the second terminal device. The encryption protection in the security activation status has only two states: One is enabled and the other one is disabled. The integrity protection in the security activation status also has only two states: One is enabled and the other one is disabled. The security activation status is a finally determined security activation status of the communication interface between the first terminal device and the second terminal device. For ease of description, the communication interface between the first terminal device and the second terminal device is referred to as a second interface.

For example, the first terminal device may set the security activation status of the second interface to be consistent with the first user plane security activation status of the first interface.

For another example, the first terminal device may determine the security activation status of the second interface after analyzing the first user plane security activation status of the first interface. If the first user plane security activation status of the first interface indicates that the integrity protection of the first interface is enabled, the first terminal device may further determine whether the integrity protection is enabled on the second interface.

There are many manners in which the first terminal device determines the security activation status of the second interface. This is not limited in this embodiment of this application.

For example, the first terminal device may determine the security activation status of the second interface based on an integrity protection maximum data rate or quality of service (QoS) control information of the second terminal device. The integrity protection maximum data rate or the QoS control information of the second terminal device may be carried in the first direct communication request.

A manner in which the first terminal device may determine the security activation status of the second interface based on the integrity protection maximum data rate of the second terminal device is the same as a manner in which the session management network element determines the first user plane security enforcement information of the session based on the integrity protection maximum data rate of the first terminal device. Details are not described herein again.

The QoS control information of the second terminal device indicates a requirement of the second terminal device during data transmission, for example, a required bandwidth, a data transmission rate, a delay, or a packet loss rate.

The first terminal device may determine, based on the QoS control information of the second terminal device, whether the second terminal device can support enabling of the integrity protection.

For example, the QoS control information of the second terminal device indicates that the second terminal device needs to transmit data, but the bandwidth required by the second terminal device to transmit the data is 100 Mbps, and a bandwidth that can be supported after the integrity protection is enabled is 50 Mbps. The first terminal device may determine not to enable the integrity protection.

Through steps 201 to 205, the user plane security policy of the relay session created by the first terminal device is determined based on the first information. The first terminal device may transmit the data of the second terminal device by using the relay session, to ensure security of the transmitted data.

During actual application, the first terminal device may further establish communication with another terminal device, and the another terminal device may exchange data with the data network by using a session of the first terminal device. In other words, the first terminal device may further transmit data of the another terminal device by using the established relay session. In this case, the relay session is reused by the another terminal device, and the user plane security policy of the relay session may need to be determined again. The following describes a manner of re-determining the user plane security policy of the relay session by using an example in which the another device is a third terminal device.

The third terminal device may send a second direct communication request to the first terminal device, where the second direct communication request requests to establish communication with the first terminal device, and the second direct communication request may include an identifier of the third terminal device.

The identifier of the third terminal device includes but is not limited to a temporary identifier, an anonymous identifier, and an SUPI that are of the third terminal device.

After receiving the second direct communication request, the first terminal device determines that the established session further needs to be for transmitting data of the third terminal device, that is, the third terminal device needs to use the relay session. The first terminal device sends a session modification request to the session management network element, where the session modification request requests to modify the relay session. The session modification request may alternatively be another session management message or a newly defined session management message.

The session modification request may include the identifier of the third terminal device, and may further carry the identifier that is of the relay session and that is for indicating the relay session that needs to be modified.

After receiving the session modification request, the session management network element may determine, based on the identifier of the third terminal device, that the third terminal device is to use the relay session. The session management network element may determine the second user plane security policy. A manner in which the session management network element determines the second user plane security policy is similar to that in step 203. For details, refer to the foregoing content. Details are not described herein again. Further, the session management network element determines, according to the second user plane security policy, whether to update the user plane security enforcement information of the relay session.

After determining the second user plane security policy, the session management network element may determine second user plane security enforcement information of the relay session according to the second user plane security policy. The second user plane security enforcement information of the relay session can be for determining a second user plane security activation status of the session between the first terminal device and the access network device.

There are many manners in which the session management network element determines the second user plane security enforcement information of the relay session according to the second user plane security policy. The following lists three of the manners.

Manner 1: The session management network element determines the second user plane security enforcement information of the relay session according only to the second user plane security policy. This manner is similar to that in step 204. For details, refer to the foregoing content. Details are not described herein again.

The session management network element may compare the second user plane security enforcement information of the relay session with the first user plane security enforcement information of the relay session. If the second user plane security enforcement information of the relay session is consistent with the first user plane security enforcement information of the relay session, it indicates that the first user plane security activation status of the first interface may remain unchanged, and the session management network element may not notify the access network device of the second user plane security enforcement information. If the second user plane security enforcement information of the relay session is inconsistent with the first user plane security enforcement information of the relay session, the session management network element may need to notify the access network device of the second user plane security enforcement information, so that the access network device can configure the second user plane security activation status of the first interface, and send, to the first terminal device, indication information indicating the second user plane security activation status of the first interface, to notify the first terminal device whether the encryption protection and the integrity protection are enabled on the first interface.

After receiving the indication information indicating the second user plane security activation status of the first interface, the first terminal device may update the security activation status of the second interface based on the second user plane security activation status of the first interface. A manner in which the first terminal device updates the security activation status of the second interface based on the second user plane security activation status of the first interface is similar to a manner in which the first terminal device determines the security activation status of the second interface based on the first user plane security activation status of the first interface. For details, refer to the foregoing descriptions. Details are not described herein again.

Manner 2: The session management network element determines the second user plane security enforcement information of the relay session according to the second user plane security policy and the first user plane security policy.

The session management network element determines, according to the second user plane security policy and the first user plane security policy, whether to enable the encryption protection and the integrity protection of the first interface.

For example, if the first user plane security policy indicates that the user plane encryption protection policy is preferred and the user plane integrity protection policy is not needed, and the second user plane security policy indicates that the user plane encryption protection policy is required and the user plane integrity protection policy is required, the session management network element may determine that the user plane encryption protection of the first interface is required and the user plane integrity protection of the first interface is required. For another example, if the first user plane security policy indicates that the user plane encryption protection policy is required and the user plane integrity protection policy is not needed, and the second user plane security policy indicates that the user plane encryption protection policy is required and the user plane integrity protection policy is required, the session management network element may determine that the user plane encryption protection of the first interface is required and the user plane integrity protection of the first interface is required.

The session management network element may retain a consistent user plane encryption protection policy or user plane integrity protection policy in the second user plane security policy and the first user plane security policy, and use the retained user plane encryption protection policy or user plane integrity protection policy as the corresponding encryption protection or integrity protection in the second user plane security enforcement information of the first interface.

For inconsistent user plane integrity protection policies or user plane encryption protection policies, the session management network element may preferentially select a user plane integrity protection policy or a user plane encryption protection policy that can improve security. For example, the session management network element selects a user plane integrity protection policy that is required and a user plane encryption protection policy that is required, and uses the preferentially selected user plane integrity protection policy or user plane encryption protection policy as the corresponding integrity protection or encryption protection in the second user plane security enforcement information of the first interface.

After determining the second user plane security enforcement information of the first interface, the session management network element may compare the second user plane security enforcement information of the relay session with the first user plane security enforcement information of the relay session. For an operation performed by the session management network element after the comparison and an operation performed by the first terminal device, refer to the descriptions in Manner 1. Details are not described herein again.

Manner 3: The session management network element determines the second user plane security enforcement information of the relay session based on the second user plane security policy and the first user plane security enforcement information of the relay session.

A manner in which the session management network element determines the second user plane security enforcement information of the relay session based on the second user plane security policy and the first user plane security enforcement information of the relay session is similar to Manner 2. The session management network element may retain consistent encryption protection or integrity protection in the second user plane security policy and the first user plane security enforcement information of the relay session, and use the retained encryption protection or integrity protection as the corresponding encryption protection or integrity protection in the second user plane security enforcement information of the first interface.

For inconsistent integrity protection or encryption protection, the session management network element may preferentially select integrity protection or encryption protection that can improve security, for example, select encryption protection that is enabled and integrity protection that is enabled.

After determining the second user plane security enforcement information of the first interface, the session management network element may compare the second user plane security enforcement information of the relay session with the first user plane security enforcement information of the relay session. For an operation performed by the session management network element after the comparison and an operation performed by the first terminal device, refer to the descriptions in Manner 1.

It should be noted that, when determining the second user plane security enforcement information of the relay session according to the second user plane security policy, the session management network element may further consider the QoS control information and/or the integrity protection maximum data rate of the first terminal device. A manner in which the session management network element determines the second user plane security enforcement information of the relay session with reference to the QoS control information and/or the integrity protection maximum data rate of the first terminal device is similar to the manner in which the session management network element determines the first user plane security enforcement information of the relay session with reference to the QoS control information and/or the integrity protection maximum data rate of the first terminal device. For details, refer to the foregoing content. Details are not described herein again.

Figure 3:
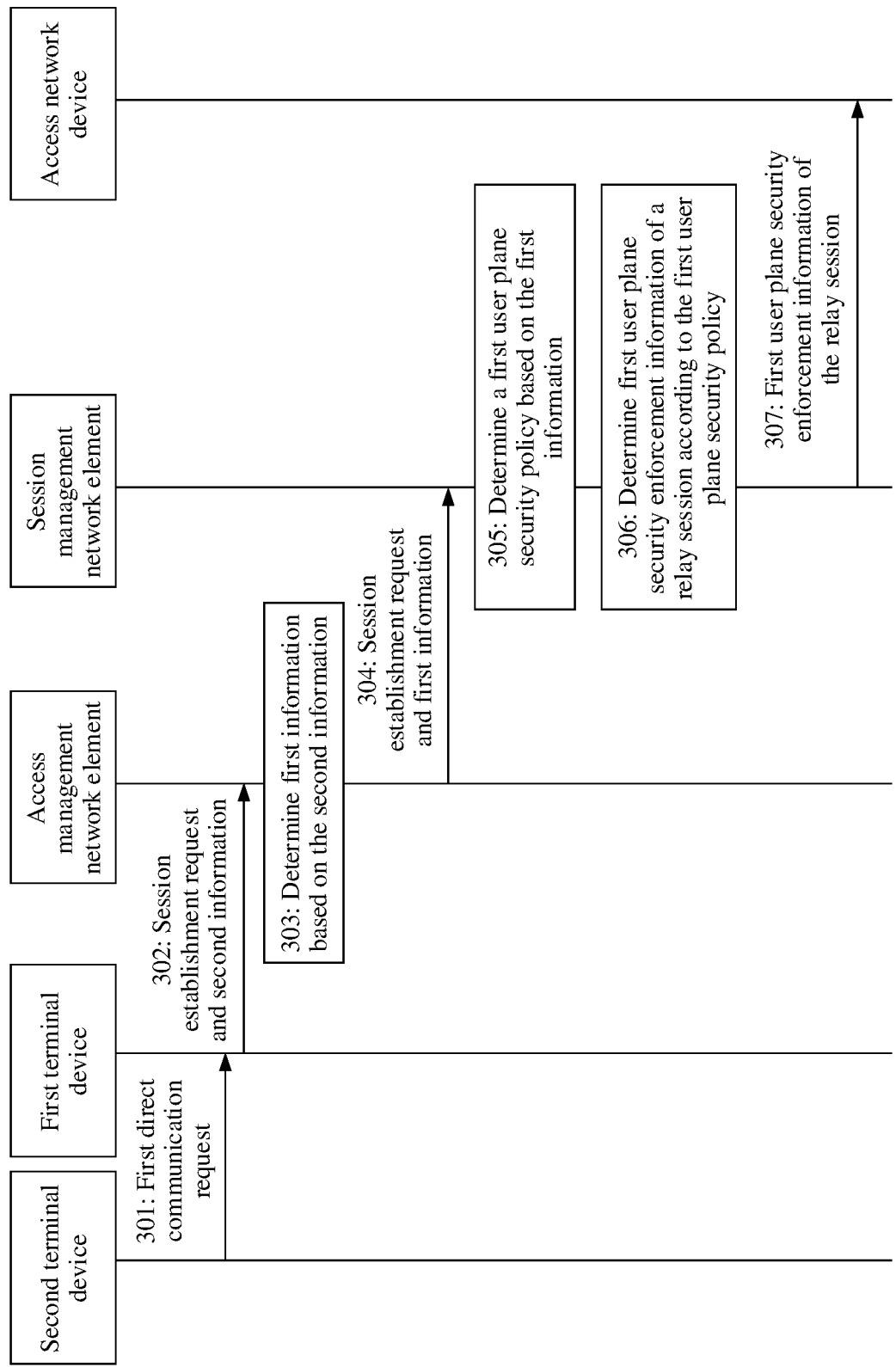
FIG. 3 is a schematic diagram of a user plane security enforcement information determining method according to an embodiment of this application.

In a second manner, FIG. 3 shows another user plane security enforcement information determining method according to an embodiment of this application. The method includes the following steps.

Step 301 is the same as step 201. For details, refer to the related descriptions in step 201. Details are not described herein again.

Step 302: After receiving the first direct communication request, the first terminal device determines that a session for transmitting the data of the second terminal device needs to be created, that is, a relay session needs to be created. The first terminal device sends a session establishment request and second information to an access and mobility management network element, where the session establishment request requests to create a relay-type session of the first terminal device, and the second information indicates that a type of the session is a relay type. A manner in which the second information indicates that the type of the session is the relay type is similar to the manner in which the first information indicates that the type of the session is the relay type. For details, refer to the foregoing descriptions. Details are not described herein again.

The first terminal device may send an N1 message to the access and mobility management network element, where the N1 message includes the second information and the session establishment request. The session establishment request is included in an N1 SM container. Optionally, the session establishment request may further carry an integrity protection maximum data rate of the first terminal device.

Step 303: The access and mobility management network element determines the first information based on the second information.

For different second information, the first information determined by the access and mobility management network element based on the second information is also different, which is separately described below.

1. The second information is the anonymous identifier or the temporary identifier of the second terminal device, and the first information is the subscription permanent identifier of the second terminal device or indicates, in an explicit manner, that the type of the session is the relay type.

A manner in which the access and mobility management network element determines the subscription permanent identifier of the second terminal device based on the anonymous identifier or the temporary identifier of the second terminal device is similar to the manner in which the session management network element determines the subscription permanent identifier of the second terminal device based on the anonymous identifier or the temporary identifier of the second terminal device in the embodiment shown in FIG. 2. The access and mobility management network element may obtain the subscription permanent identifier of the second terminal device from a unified data management network element based on the anonymous identifier or the temporary identifier of the second terminal device. For details, refer to the foregoing content. Details are not described herein again.

Optionally, the second information may alternatively be the subscription permanent identifier of the second terminal device, and the first information is also the subscription permanent identifier of the second terminal device or indicates, in an explicit manner, that the type of the session is the relay type.

The access and mobility management network element may determine, based on the second information, that the established session is the relay session, and perform an authorization check on the first terminal device to determine whether the first terminal device has permission to create the relay session. The access and mobility management network element may obtain subscription information of the first terminal device from the unified data management network element or another network element (a network element that supports subscription information storage), and determine, based on the subscription information, whether the first terminal device is authorized to establish the relay session. The subscription information indicates whether the first terminal device is allowed to serve as a relay device and/or whether the first terminal device is authorized to establish a relay session corresponding to a requested DNN and/or S-NSSAI (as described above, that the first terminal device is allowed to serve as the relay device may be explicitly indicated by using relay identification information, or that the first terminal device is allowed to serve as the relay device may be implicitly indicated by distinguishing user plane security policies by using the relay session and a non-relay session. Whether the first terminal device is authorized to establish the relay session corresponding to the requested DNN and/or the S-NSSAI may be determined by whether a user plane security policy corresponding to the DNN and/or a user plane security policy corresponding to the S-NSSAI carry/carries the relay identification information or use/uses the relay session or the non-relay session). The access and mobility management network element may check whether the first terminal device can establish a relay session of a specific type, for example, a relay session corresponding to a specific DNN and/or specific S-NSSAI.

Optionally, the access and mobility management network element may determine, based on the second information, to initiate an authorization check procedure to another network element, so that an authorization check network element determines whether the first terminal device is authorized to create the relay session and/or determines whether the first terminal can serve as the relay device of the second terminal device. The access and mobility management network element determines, based on the result sent by the authorization check network element, whether the first terminal is authorized to establish the relay session and/or determines whether the first terminal can serve as the relay device of the second terminal.

Optionally, the access and mobility management network element may alternatively determine, based on the second information, whether the first terminal can serve as the relay device of the second terminal.

Optionally, the access and mobility management network element may alternatively perform an authorization check on the second terminal device based on the second information, to determine whether the second terminal device can perform data transmission by using the relay UE. The access and mobility management network element may obtain subscription information of the second terminal device from the unified data management network element or the another network element, and determine, based on the subscription information, whether the second terminal device is authorized to use the relay session. The subscription information indicates whether the second terminal device can perform data transmission by using the relay UE.

After the authorization check performed by the access and mobility management network element on the first terminal device succeeds, the access and mobility management network element may send the first information to a session management network element. Otherwise, the access and mobility management network element may reject the session establishment request of the first terminal device.

2. The first information indicates, in an explicit manner, that the type of the session is the relay type.

After receiving the second information, the access and mobility management network element may determine that the session that the first terminal device needs to create is the relay session, that is, the session subsequently needs to transmit the data of the second terminal device.

The access and mobility management network element may perform an authorization check on the first terminal device based on the second information, to determine whether the first terminal device has permission to create the relay session. The access and mobility management network element may obtain subscription information of the first terminal device from a unified data management network element or another network element (a network element that supports subscription information storage), and determine, based on the subscription information, whether the first terminal device is authorized to establish the relay session. The subscription information indicates whether the first terminal device is authorized to serve as a relay UE and/or whether the first terminal device is authorized to establish a relay session corresponding to a requested DNN and/or S-NSSAI. The access and mobility management network element may check whether the first terminal device can establish a relay session of a specific type, for example, a relay session corresponding to a specific DNN and/or specific S-NSSAI.

Optionally, the access and mobility management network element may determine, based on the second information, to initiate an authorization check procedure to another network element, so that an authorization check network element determines whether the first terminal device is authorized to create the relay session Optionally, the access and mobility management network element may alternatively perform an authorization check on the second terminal device based on the second information, to determine whether the second terminal device can perform data transmission by using the relay UE. The access and mobility management network element may obtain subscription information of the second terminal device from the unified data management network element or the another network element, and determine, based on the subscription information, whether the second terminal device is authorized to use the relay session. The subscription information indicates whether the second terminal device can perform data transmission by using the relay UE.

After the authorization check performed by the access and mobility management network element on the first terminal device succeeds, the access and mobility management network element may send the first information to a session management network element. Otherwise, the access and mobility management network element may reject the session establishment request of the first terminal device.

3. The first information is the same as the second information.

This is similar to the previous case. The access and mobility management network element may perform an authorization check on the first terminal device based on the second information. If the authorization check performed by the access and mobility management network element on the first terminal device succeeds, the access and mobility management network element may send the first information to a session management network element. That is, the first information sent by the access and mobility management network element to the session management network element is the same as the second information sent by the first terminal device to the access and mobility management network element. Otherwise, the access and mobility management network element may reject the session establishment request of the first terminal device.

Step 304: The access and mobility management network element sends the session establishment request and the first information to the session management network element.

Step 305 is the same as step 203. For details, refer to the related descriptions in step 203. Details are not described herein again.

Step 306 is the same as step 204. For details, refer to the related descriptions in step 204. Details are not described herein again.

Step 307 is the same as step 205. For details, refer to the related descriptions in step 205. Details are not described herein again.

Through steps 301 to 307, the user plane security policy of the relay session created by the first terminal device is determined based on the first information. The first terminal device may transmit the data of the second terminal device by using the relay session, to ensure security of the transmitted data.

During actual application, the first terminal device may further establish communication with another terminal device, and the another terminal device may exchange data with a data network by using a session of the first terminal device. In other words, the first terminal device may further transmit data of the another terminal device by using the established relay session. In this case, the relay session is reused by the another terminal device, and the user plane security policy of the relay session may need to be determined again. For a manner in which a third terminal device reuses the relay session and re-determines the user plane security policy of the relay session, refer to the related descriptions in FIG. 2. Details are not described herein again.

It should be noted that, when the third terminal device reuses the relay session, the first terminal device may also send a temporary identifier or an anonymous identifier of the third terminal device to the access and mobility management network element in a manner shown in FIG. 3. The access and mobility management network element may also determine a subscription permanent identifier of the third terminal device in a similar manner, and then send a session modification request (where the session modification request does not carry an identifier of the third terminal device) and the subscription permanent identifier of the third terminal device to the session management network element.

It should be noted that, in the embodiments shown in FIG. 2 and FIG. 3, an example in which the first terminal device requests creation of the relay session after the second terminal device initiates the first direct communication request is used. During actual application, the first terminal device may alternatively establish the relay session in advance before the second terminal device initiates the first direct communication request, that is, send the session establishment request to the session management network element. In this case, the first information may directly indicate, in an explicit indication manner, that the type of the session is the relay type.

Based on the network architecture shown in FIG. 1, the following further describes, by using an example in which the unified data management network element is the UDM network element, the session management network element is the SMF network element, the access and mobility management network element is the AMF network element, the first terminal device is the relay UE, and the second terminal device is the remote UE, the user plane security enforcement information determining method shown in FIG. 2. FIG. 4A and FIG. 4B show a user plane security enforcement information determining method according to an embodiment of this application. The method includes the following steps.

Step 401: A user plane security policy to which the relay UE subscribes is configured in the UDM network element, where the user plane security policy includes a user plane security policy of a relay session. The user plane security policy to which the relay UE subscribes may be shown in Table 1 to Table 3. The table is merely a data presentation manner. A presentation manner of the user plane security policy to which the relay UE subscribes is not limited in this embodiment of this application. For example, the user plane security policy to which the relay UE subscribes may alternatively be presented in a data mapping manner.

Step 402: The relay UE sends a session establishment request to the SMF network element, where the session establishment request requests to create a relay-type session of the relay UE, the session establishment request includes first information, and the first information indicates that a type of the session is a relay type.

Step 403: The SMF network element sends a first subscription information obtaining request to the UDM network element, where the first subscription information obtaining request includes the first information, the first subscription information obtaining request requests to obtain subscription information of the first terminal device, and the subscription information includes the user plane security policy to which the relay UE subscribes.

Step 404: After receiving the first subscription information obtaining request, the UDM network element determines the user plane security policy to which the relay UE subscribes.

Step 405: The UDM network element sends a first subscription information obtaining response to the SMF network element, where the first subscription information obtaining response includes the user plane security policy to which the relay UE subscribes.

It should be noted that the first subscription information obtaining request sent by the SMF network element to the UDM network element may request all subscription information of the first terminal device, including the user plane security policy of the relay session of the first terminal device (where the user plane security policy of the relay session includes a first user plane security policy and another user plane security policy of the relay session) and a user plane security policy of a non-relay session. The first subscription information obtaining response sent by the UDM network element to the SMF network element includes all the subscription information of the first terminal device. The SMF network element may determine the first user plane security policy in all the subscription information of the first terminal device. Further, the first subscription information obtaining request sent by the SMF network element to the UDM network element may request all subscription information corresponding to a DNN/S-NSSAI of the relay session of the first terminal device. Further, the SMF network element determines the first user plane security policy in all the subscription information.

In another possible implementation, the first subscription information obtaining request sent by the SMF network element to the UDM network element may alternatively request some subscription information of the first terminal device, for example, subscription information of the first terminal device serving as the relay UE. The subscription information of the first terminal device serving as the relay UE includes the user plane security policy of the relay session of the first terminal device (where the user plane security policy of the relay session includes a first user plane security policy and another user plane security policy of the relay session). The first subscription information obtaining response sent by the UDM network element to the SMF network element may include all subscription information of the first terminal device serving as the relay UE, for example, the first user plane security policy and the another user plane security policy of the relay session; or may include only some subscription information of the first terminal device serving as the relay UE, for example, include only the user plane security policy of the relay session of the first terminal device. When receiving the user plane security policy of the relay session of the first terminal device, the SMF network element determines the first user plane security policy in the user plane security policy of the relay session of the first terminal device.

Step 406: The SMF network element determines first user plane security enforcement information of the relay session according to the first user plane security policy, where the first user plane security enforcement information indicates a first user plane security activation status of a first interface, and the first interface may also be referred to as a Uu interface.

Step 407: The SMF network element sends the first user plane security enforcement information of the relay session to the RAN, and the RAN configures the first user plane security activation status of the first interface based on the first user plane security enforcement information of the relay session, and activates a user plane security activation status of the relay session.

Step 408: The RAN sends first indication information to the relay UE, where the first indication information indicates the first user plane security activation status of the first interface.

Step 409: The remote UE sends a first direct communication request to the relay UE, where the first direct communication request includes an identifier of the remote UE, and optionally, may further include an integrity protection maximum data rate of the remote UE.

Step 410: After receiving the first direct communication request, the relay UE determines that the created relay session needs to be for transmitting data of the second terminal device, and determines security activation status information of a PC5 interface based on the first user plane security activation status of the first interface, where the PC5 interface is a communication interface between the relay UE and the remote UE.

For example, the relay UE may set the first user plane security activation status of the first interface to a security activation status of the PC5 interface. For example, if encryption protection of the first interface is required, and integrity protection of the first interface is not needed, the encryption protection of the PC5 interface is also enabled, and the integrity protection of the PC5 interface is disabled.

For another example, if integrity protection of the first interface is enabled, the relay UE may determine, based on the integrity protection maximum data rate and/or QoS control information of the remote UE, whether to activate the integrity protection.

Step 411: The relay UE sends a first direct security mode command to the remote UE, where the first direct security mode command includes an encryption protection indication and an integrity protection indication that respectively indicate whether to enable the encryption protection and whether to enable the integrity protection.

Step 412: After receiving the first direct security mode command, the remote UE configures the encryption protection and the integrity protection of the PC5 interface according to the first direct security mode command, and sends a first direct security mode complete message to the relay UE.

Step 413: The relay UE sends a first direct communication response to the remote UE.

It should be noted that, in the foregoing descriptions, the relay session creation procedure (step 402 to step 408) is performed before the second terminal device starts to initiate the direct communication procedure (step 409). During actual application, the relay session creation procedure may alternatively be performed after step 409. In other words, after the relay UE receives the first direct communication request of the remote UE, when the relay session is not established or the established relay session cannot be reused, the relay UE may initiate a procedure of creating a relay session. In this case, the identifier of the remote UE may be used as the first information in the session establishment request.

Figure 5A:
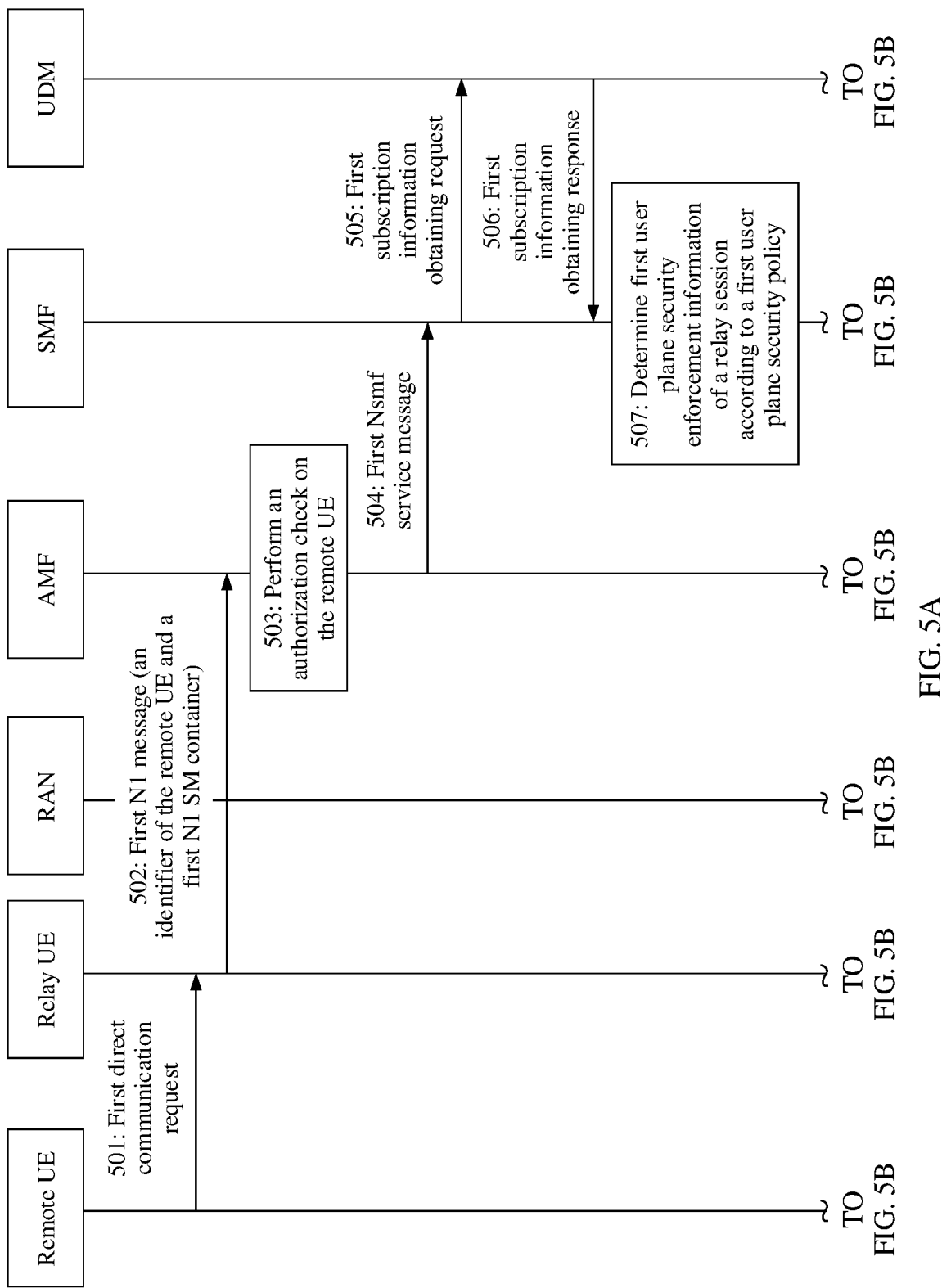

Based on the network architecture shown in FIG. 1, the following further describes, by using an example in which the unified data management network element is the UDM network element, the session management network element is the SMF network element, the access and mobility management network element is the AMF network element, the first terminal device is the relay UE, and the second terminal device is the remote UE, the user plane security enforcement information determining method shown in FIG. 3. FIG. 5A and FIG. 5B show a user plane security policy determining method according to an embodiment of this application. The method includes the following steps.

Step 501 is the same as step 409. For details, refer to the related descriptions in step 409. Details are not described herein again.

Step 502: After receiving the first direct communication request, the relay UE determines that a relay session needs to be established, and the relay UE sends a first N1 message to the AMF network element, where the first N1 message includes an identifier of the remote UE and a first N1 SM container, the first N1 SM container includes a session establishment request, and the first N1 SM container includes an integrity protection maximum data rate of the relay UE.

Step 503: After the AMF network element receives the first N1 message, the AMF network element may determine, based on the identifier of the remote UE, that the session that the relay UE needs to create is the relay session, and the AMF network element performs an authorization check on the relay UE, to determine that the relay UE has permission to create the relay session.

Optionally, if the identifier of the remote UE is a temporary identifier or an anonymous identifier, the AMF network element may obtain an SUPI of the remote UE from the UDM network element based on the identifier of the remote UE. The AMF network element performs an authorization check on the remote UE based on the SUPI of the remote UE, to determine that the remote UE may transmit data by using the relay UE.

Step 504: After the authorization check performed by the AMF network element on the relay UE succeeds, the AMF network element sends a first Nsmf service message to the SMF network element, where the first Nsmf service message includes the SUPI of the remote UE and the first N1 SM container.

Step 505: After receiving the first NSMF network element service message, the SMF network element sends, to the UDM network element, a first subscription information obtaining request that carries the SUPI of the remote UE, where the first subscription information obtaining request further includes a DNN and S-NSSAI that are of the relay session.

Step 506: The UDM network element determines a first user plane security policy based on the SUPI of the remote UE and a user plane security policy to which the relay UE subscribes, and then sends a first subscription information obtaining response to the SMF network element, where the first subscription information obtaining response includes the first user plane security policy.

Step 507 is the same as step 406. For details, refer to the related descriptions in step 406. Details are not described herein again.

Step 508 is the same as step 407. For details, refer to the related descriptions in step 407. Details are not described herein again.

Step 509 is the same as step 408. For details, refer to the related descriptions in step 408. Details are not described herein again.

Step 510 is the same as step 410. For details, refer to the related descriptions in step 410. Details are not described herein again.

Step 511 is the same as step 411. For details, refer to the related descriptions in step 411. Details are not described herein again.

Step 512 is the same as step 412. For details, refer to the related descriptions in step 412. Details are not described herein again.

Step 513 is the same as step 413. For details, refer to the related descriptions in step 413. Details are not described herein again.

Figure 6B:
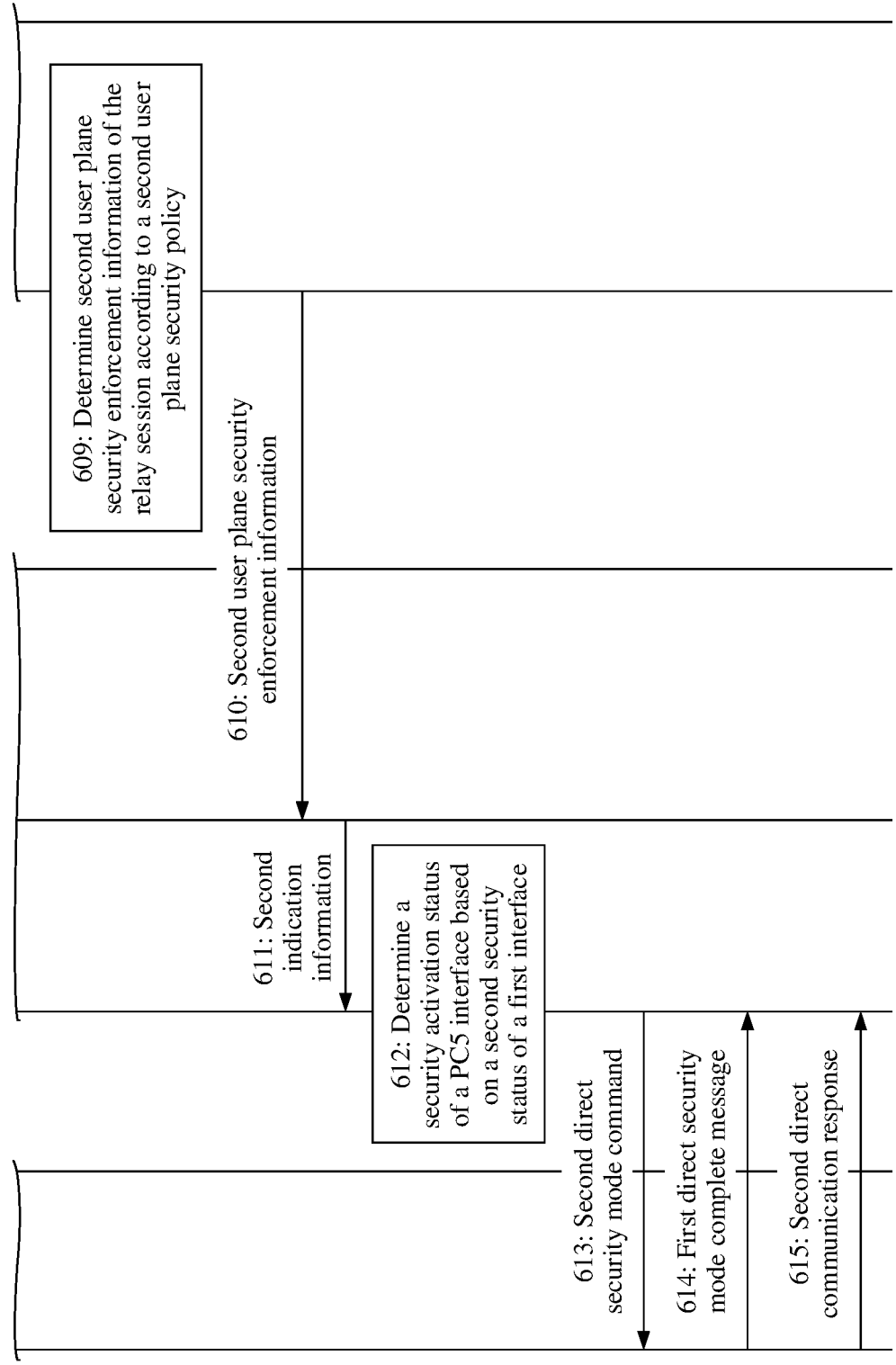

Based on the network architecture shown in FIG. 1, the following further describes, by using an example in which the unified data management network element is the UDM network element, the session management network element is the SMF network element, the access and mobility management network element is the AMF network element, the first terminal device is the relay UE, the second terminal device is a remote UE 1, and the third terminal device is a remote UE 2, the user plane security enforcement information determining methods shown in FIG. 2 and FIG. 3. FIG. 6A and FIG. 6B show a user plane security enforcement information determining method according to an embodiment of this application. The method includes the following steps.

Step 60i: The relay UE transmits data of the remote UE 1 by using a relay session. For a manner of establishing the relay session, refer to the embodiments shown in FIG. 2 to FIG. 5B.

Step 602: The remote UE 2 sends a second direct communication request to the relay UE, where the second direct communication request carries an integrity protection maximum data rate of the remote UE 2.

Step 603: After receiving the second direct communication request, the relay UE determines that the remote UE 2 is to reuse the established relay session.

Step 604: The relay UE sends a second N1 message to the AMF network element, where the second N1 message includes an identifier of the remote UE 2 and a second N1 SM container, and the second N1 SM container includes a session modification request.

It should be noted that, if encryption protection of the relay session is enabled, and integrity protection of the relay session is enabled, a session modification procedure may not be initiated, that is, step 604 and subsequent steps do not need to be performed.

Step 605: After receiving the second N1 message, the AMF network element may send a second Nsmf service message to the SMF network element, where the second Nsmf service message includes the identifier of the remote UE 2 and the second N1 SM container.

Step 606: After the SMF network element receives the second NSMF network element service message, if the identifier of the remote UE 2 is a temporary identifier or an anonymous identifier, the SMF network element may first obtain an SUPI of the remote UE 2 from the UDM network element based on the identifier of the remote UE 2.

Step 607: The SMF network element sends, to the UDM network element, a second subscription information obtaining request that carries the SUPI of the remote UE 2, where the second subscription information obtaining request further includes a DNN and S-NSSAI that are of the relay session.

Step 608: The UDM network element sends a second subscription information obtaining response to the SMF network element, where the second subscription information obtaining response includes a second user plane security policy.

Step 609: The SMF network element determines second user plane security enforcement information of the relay session according to the second user plane security policy.

For example, the SMF network element determines the second user plane security enforcement information of the relay session according to a first user plane security policy and the second user plane security policy. Then, the SMF network element compares first user plane security enforcement information of the relay session with the second user plane security enforcement information of the relay session, and performs step 609 if the first user plane security enforcement information of the relay session is different from the second user plane security enforcement information of the relay session.

If the second user plane security policy and the first user plane security policy indicate that the integrity protection of the relay session is enabled or preferably enabled, the SMF network element may determine the second user plane security enforcement information of the relay session based on an integrity protection maximum data rate of the relay UE.

For another example, the SMF network element determines the second user plane security enforcement information of the relay session based on the second user plane security policy and first user plane security enforcement information. Then, the SMF network element compares the first user plane security enforcement information of the relay session with the second user plane security enforcement information of the relay session, and performs step 609 if the first user plane security enforcement information of the relay session is different from the second user plane security enforcement information of the relay session.

If the second user plane security policy and the first user plane security enforcement information indicate that the integrity protection is enabled or preferably enabled, the SMF network element may determine the second user plane security enforcement information of the relay session based on an integrity protection maximum data rate of the relay UE.

For another example, the SMF network element determines the second user plane security enforcement information of the relay session according to the second user plane security policy. Then, the SMF network element compares first user plane security enforcement information of the relay session with the second user plane security enforcement information of the relay session, and performs step 609 if the first user plane security enforcement information of the relay session is different from the second user plane security enforcement information of the relay session.

Step 610: The SMF network element sends the second user plane security enforcement information of the relay session to the RAN, and the RAN configures a second user plane security activation status of a first interface based on the second user plane security enforcement information of the relay session, and activates a user plane security activation status of the relay session.

Step 611: The RAN sends second indication information to the relay UE, where the second indication information indicates the second user plane security activation status of the first interface.

Step 612: The relay UE updates a security activation status of a PC5 interface based on the second user plane security activation status of the first interface.

Step 613: The relay UE sends a second direct security mode command to the remote UE 2, where the second direct security mode command includes an encryption protection indication and an integrity protection indication that respectively indicate whether to enable the encryption protection and whether to enable the integrity protection.

Step 614: After receiving the second direct security mode command, the remote UE 2 configures the encryption protection and the integrity protection of the PC5 interface according to the second direct security mode command, and sends a second direct security mode complete message to the relay UE.

Step 615: The relay UE sends a second direct communication response to the remote UE 2.

Figure 7:
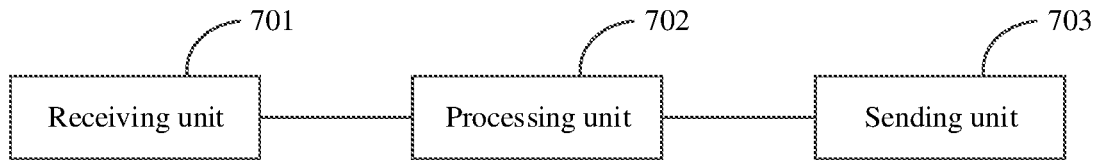
FIG. 7 to FIG. 13 each are a schematic diagram of a structure of a communication apparatus according to an embodiment of this application.

Based on a same inventive concept as the method embodiments, an embodiment of this application further provides a communication apparatus, configured to perform the methods performed by the session management network element or the SMF network element in the foregoing method embodiments. For related features, refer to the foregoing method embodiments. Details are not described herein again. As shown in FIG. 7, the apparatus includes a receiving unit 701, a processing unit 702, and a sending unit 703.

The receiving unit 701 is configured to receive a first request, where the first request requests to create a relay-type session of a first terminal device, the first request includes first information, and the first information indicates that a type of the session is a relay type.

The processing unit 702 is configured to determine first user plane security enforcement information of the session based on the first information.

The sending unit 703 is configured to send the first user plane security enforcement information of the session to an access network device, where the first user plane security enforcement information of the session is for determining a first user plane security activation status of the session between the first terminal device and the access network device.

In a possible implementation, the first request includes an N1 SM container, and the N1 SM container includes the first information. The first request includes the first information and an N1 SM container.

In a possible implementation, when determining the first user plane security enforcement information of the session based on the first information, the processing unit 702 may obtain a first user plane security policy based on the first information; and then may directly use the first user plane security policy as the first user plane security enforcement information of the session; or may analyze the first user plane security policy, and determine the first user plane security enforcement information of the session according to the first user plane security policy.

In a possible implementation, when the processing unit 702 obtains the first user plane security policy based on the first information, the sending unit 703 may send a first subscription information obtaining request to a unified data management network element, where a user plane security policy to which the first terminal device subscribes indicates a user plane security policy of the relay-type session of the first terminal device and a user plane security policy of a non-relay-type session of the first terminal device. Then the receiving unit 701 receives a first subscription information obtaining response from the unified data management network element, where the first subscription information obtaining response includes the user plane security policy to which the first terminal device subscribes. The processing unit 702 then determines the user plane security policy of the relay-type session of the first terminal device as the first user plane security policy based on the first information.

In a possible implementation, when the processing unit 702 obtains the first user plane security policy based on the first information, the sending unit 703 may send a first subscription information obtaining request to a unified data management network element, where the first subscription information obtaining request includes a relay indication, and the relay indication requests a user plane security policy of the relay-type session of the first terminal device. Then, the receiving unit 701 receives a first subscription information obtaining response from the unified data management network element, where the first subscription information obtaining response includes a user plane security policy to which the first terminal device subscribes (where the user plane security policy to which the first terminal device subscribes includes the first user plane security policy). The processing unit 702 then determines the first user plane security policy based on the first information and the user plane security policy to which the first terminal device subscribes.

In a possible implementation, the first information is a temporary identifier or an anonymous identifier of a second terminal device. When the processing unit 702 obtains the first user plane security policy based on the first information, the processing unit 702 may obtain an SUPI of the second terminal device based on the temporary identifier or the anonymous identifier of the second terminal device. Then, the sending unit 703 may send the first subscription information obtaining request to the unified data management network element, where the first subscription information obtaining request includes the SUPI of the second terminal device. The receiving unit 701 may receive the first subscription information obtaining response from the unified data management network element, where information carried in the first subscription information obtaining response may be any one of the following:

1. The first subscription information obtaining response includes the first user plane security policy.

2. The first subscription information obtaining response includes the user plane security policy of the relay-type session of the first terminal device. Then, the processing unit 702 determines the first user plane security policy according to the user plane security policy of the relay-type session of the first terminal device.

3. The first subscription information obtaining response includes a user plane security policy to which the second terminal device subscribes. Then, the processing unit 702 determines the first user plane security policy according to the user plane security policy to which the second terminal device subscribes.

In a possible implementation, when the processing unit 702 obtains the first user plane security policy based on the first information, the sending unit 703 may send a first subscription information obtaining request to a unified data management network element, where the first subscription information obtaining request includes the first information. Then, the receiving unit 701 receives a first subscription information obtaining response from the unified data management network element, where the first subscription information obtaining response includes the first user plane security policy.

In a possible implementation, the first information is an identifier of the second terminal device, and the identifier of the second terminal device includes one or more of the following: the temporary identifier of the second terminal device, the anonymous identifier of the second terminal device, or the subscription permanent identifier SUPI of the second terminal device.

In a possible implementation, the first user plane security policy indicates that integrity protection is preferred. When determining the first user plane security enforcement information of the session according to the first user plane security policy, the processing unit 702 may determine, after determining that an integrity protection maximum data rate of the first terminal device is less than a data rate required by the session, that the integrity protection of the session is not needed.

In a possible implementation, if the first user plane security policy indicates that integrity protection is required, the processing unit 702 may determine whether an integrity protection maximum data rate of the first terminal device is less than a data rate required by the session. After the processing unit 702 determines that the integrity protection maximum data rate of the first terminal device is less than the data rate required by the session, the sending unit 703 sends a session establishment reject response to the first terminal device, where the session establishment reject response indicates rejection of session establishment.

In a possible implementation, the receiving unit 701 may further receive a third request, where the third request indicates that a third terminal device is to use the session, and the third request includes an identifier of the third terminal device. The processing unit 702 may determine second user plane security enforcement information of the session based on the identifier of the third terminal device. The sending unit 703 may send the second user plane security enforcement information of the session to the access network device, where the second user plane security enforcement information of the session is for determining a second user plane security activation status of the session between the first terminal device and the access network device.

In a possible implementation, when determining the second user plane security enforcement information of the session based on the identifier of the third terminal device, the processing unit 702 may determine a second user plane security policy based on the identifier of the third terminal device; and then determine the second user plane security enforcement information of the session according to the second user plane security policy.

In a possible implementation, the identifier of the third terminal device includes one or more of the following: a temporary identifier of the third terminal device, an anonymous identifier of the third terminal device, or a subscription permanent identifier SUPI of the third terminal device.

In a possible implementation, when determining the second user plane security enforcement information of the session according to the second user plane security policy, the processing unit 702 may determine the second user plane security enforcement information of the session based on the second user plane security policy and the first user plane security enforcement information of the session; may determine the second user plane security enforcement information of the session according to the second user plane security policy and the first user plane security policy; or may determine the second user plane security enforcement information of the session according only to the second user plane security policy.

In a possible implementation, when the processing unit 702 obtains the second user plane security policy based on the identifier of the third terminal device, the sending unit 703 may send a second subscription information obtaining request to the unified data management network element, where the second subscription information obtaining request includes the identifier of the third terminal device. The receiving unit 701 may receive a second subscription information obtaining response from the unified data management network element, where the second subscription information obtaining response includes the second user plane security policy.

In a possible implementation, when the processing unit 702 obtains the second user plane security policy based on the identifier of the third terminal device, the processing unit 702 may determine the second user plane security policy based on the identifier of the third terminal device and the user plane security policy to which the first terminal device subscribes.

In a possible implementation, when the processing unit 702 obtains the second user plane security policy based on the identifier of the third terminal device, the sending unit 703 sends a second subscription information obtaining request to the unified data management network element, where the second subscription information obtaining request includes the identifier of the third terminal device. The receiving unit 701 receives a second subscription information obtaining response from the unified data management network element, where the second subscription information obtaining response includes the user plane security policy of the relay-type session of the first terminal device. The processing unit 702 determines the second user plane security policy according to the user plane security policy of the relay-type session of the first terminal device.

In a possible implementation, when the processing unit 702 obtains the second user plane security policy based on the identifier of the third terminal device, the sending unit 703 sends a second subscription information obtaining request to the unified data management network element, where the second subscription information obtaining request includes the identifier of the third terminal device. The receiving unit 701 receives a second subscription information obtaining response from the unified data management network element, where the second subscription information obtaining response includes a user plane security policy to which the third terminal device subscribes. The processing unit 702 determines the second user plane security policy according to the user plane security policy to which the third terminal device subscribes.

In a possible implementation, before the sending unit 703 sends the second user plane security enforcement information of the session to the access network device, the processing unit 702 may determine that the first user plane security enforcement information of the session is different from the second user plane security enforcement information of the session.

In a possible implementation, the second user plane security policy indicates that the integrity protection of the session is preferred. When determining the second user plane security enforcement information of the session according to the second user plane security policy, the processing unit 702 determines, after determining that the integrity protection maximum data rate of the first terminal device is less than the data rate required by the session, to disable the integrity protection of the session.

Figure 8:
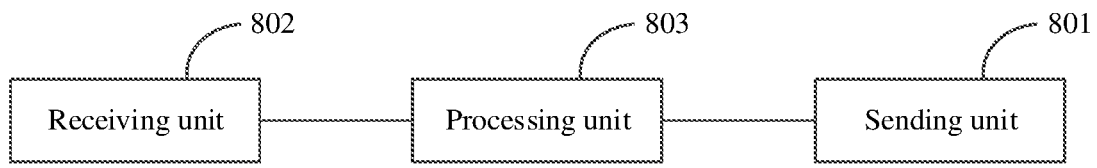

Based on a same inventive concept as the method embodiments, an embodiment of this application further provides a communication apparatus, configured to perform the methods performed by the first terminal device or the relay UE in the foregoing method embodiments. For related features, refer to the foregoing method embodiments. Details are not described herein again. As shown in FIG. 8, the apparatus includes a sending unit 801 and a receiving unit 802.

The sending unit 801 is configured to send a second request to an access and mobility management network element, where the second request requests to create a relay-type session, the second request includes second information, and the second information indicates that a type of the session is a relay type.

The receiving unit 802 is configured to receive first indication information sent by an access network device, where the first indication information indicates a first user plane security activation status of the session between the first terminal device and the access network device.

In a possible implementation, before the sending unit 801 sends the second request, the receiving unit 802 may receive a first direct communication request sent by a second terminal device, where the first direct communication request is for establishing communication with the first terminal device.

In a possible implementation, the second request includes an N1 SM container, and the N1 SM container includes the second information; or the second request includes the second information and an N1 SM container.

In a possible implementation, the session is for transmitting data of the second terminal device. The second information includes one or more of the following: a temporary identifier of the second terminal device, an anonymous identifier of the second terminal device, or an SUPI of the second terminal device.

In a possible implementation, the apparatus further includes a processing unit 803.

The receiving unit 802 may receive a second direct communication request sent by a third terminal device, where the second direct communication request is for establishing communication with the first terminal device. Then, the processing unit 803 may determine, based on the second direct communication request, that the third terminal device is to use the session. The sending unit 801 may send a third request to the access and mobility management network element, where the third request indicates that the third terminal device is to use the session, and the third request includes an identifier of the third terminal device.

In a possible implementation, the identifier of the third terminal device includes one or more of the following: a temporary identifier of the third terminal device, an anonymous identifier of the third terminal device, or an SUPI of the third terminal device.

In a possible implementation, after the receiving unit 802 receives, from the access network device, the first indication information indicating the first user plane security activation status, the processing unit 803 may determine a security activation status between the first terminal device and the second terminal device based on the first user plane security activation status between the first terminal device and the access network device.

In a possible implementation, if integrity protection in the first user plane security activation status is required, when configuring the security activation status between the first terminal device and the second terminal device based on the first user plane security activation status, the processing unit 803 may determine, based on an integrity protection maximum data rate or QoS control information of the second terminal device, whether to enable the integrity protection between the first terminal device and the second terminal device.

In a possible implementation, if the integrity protection in the first user plane security activation status is not needed, the sending unit 801 may send a direct communication reject message to the second terminal device when a user plane security policy of the second terminal device indicates that the integrity protection is required.

In a possible implementation, the receiving unit 802 may further receive second indication information from the access network device, where the second indication information indicates a second user plane security activation status of the session between the first terminal device and the access network device.

The processing unit 803 may update the first user plane security activation status to the second user plane security activation status based on the second indication information.

In a possible implementation, after the receiving unit 802 receives the second indication information from the access network device, the processing unit 803 may update the security activation status between the first terminal device and the second terminal device based on the second user plane security activation status.

In a possible implementation, the integrity protection in the second user plane security activation status is required. When updating the security activation status between the first terminal device and the second terminal device based on the second user plane security activation status, the processing unit 803 may determine, based on an integrity protection maximum data rate or QoS control information of the third terminal device, whether to enable the integrity protection between the first terminal device and the second terminal device.

Figure 9:
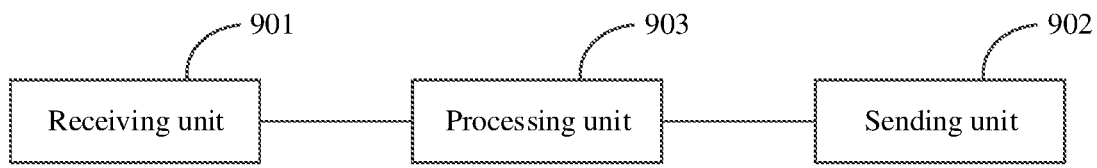

Based on a same inventive concept as the method embodiments, an embodiment of this application further provides a communication apparatus, configured to perform the methods performed by the access and mobility management network element or the AMF network element in the foregoing method embodiments. For related features, refer to the foregoing method embodiments. Details are not described herein again. As shown in FIG. 9, the apparatus includes a receiving unit 901 and a sending unit 902.

The receiving unit 901 is configured to receive a second request sent by a first terminal device, where the second request includes second information, the second request requests to create a relay-type session of the first terminal device, and the second information indicates that a type of the session is a relay type.

The sending unit 902 is configured to send a first request to a session management network element based on the second request, where the first request includes first information, the first information indicates that the type of the session is the relay type, and the first request requests to create the relay-type session of the first terminal device.

In a possible implementation, the second information is the same as the first information, the first request and the second request each include an N1 SM container, and the N1 SM container includes the second information.

In a possible implementation, the second request includes the second information and an N1 SM container, and the first request includes the first information and the N1 SM container.

In a possible implementation, the apparatus includes a processing unit 903. The processing unit 903 may determine, based on the second information, that the first terminal device is authorized to establish the session. After the processing unit 903 determines, based on the second information, that the first terminal device is authorized to establish the session, the sending unit 902 sends the first request to the session management network element.

In a possible implementation, the second information is a temporary identifier or an anonymous identifier of a second terminal device, and the first information is an SUPI of the second terminal device.

In a possible implementation, the second information includes one or more of the following: a temporary identifier of a second terminal device, an anonymous identifier of the second terminal device, or an SUPI of the second terminal device.

In a possible implementation, before the sending unit 902 sends the first request to the session management network element based on the second request, the processing unit 903 may determine, based on the second information, that the first terminal device is authorized to establish a session for the second terminal device.

Figure 10:
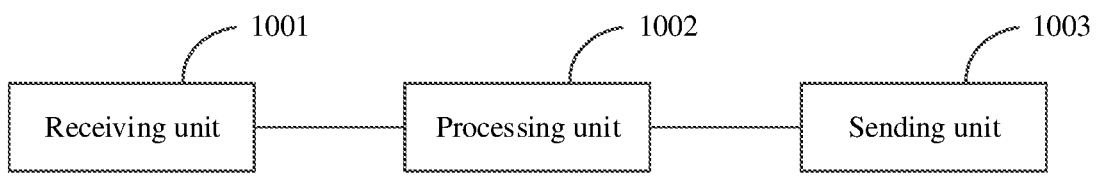

Based on a same inventive concept as the method embodiments, an embodiment of this application further provides a communication apparatus, configured to perform the methods performed by the unified data management network element or the UDM network element in the foregoing method embodiments. For related features, refer to the foregoing method embodiments. Details are not described herein again. As shown in FIG. 10, the apparatus includes a receiving unit 1001, a processing unit 1002, and a sending unit 1003.

The receiving unit 1001 is configured to receive a first subscription information obtaining request from a session management network element, where the first subscription information obtaining request requests a user plane security policy to which a first terminal device subscribes, the first subscription information obtaining request includes first information, and the first information indicates that a type of a session is a relay type.

The processing unit 1002 is configured to determine a first user plane security policy based on the first information.

The sending unit 1003 is configured to send a first subscription information obtaining response to the session management network element, where the first subscription information obtaining response includes the first user plane security policy.

In a possible implementation, when determining the first user plane security policy based on the first information, the processing unit 1002 may determine the first user plane security policy based on the first information and a user plane security policy to which a first terminal device subscribes, where the user plane security policy to which the first terminal device subscribes indicates user plane security policies of a relay-type session and a non-relay-type session of the first terminal device.

In a possible implementation, the first information is an identifier of a second terminal device. When the processing unit 1002 determines the first user plane security policy based on the first information, the processing unit 1002 determines, based on the identifier of the second terminal device, the first user plane security policy in a user plane security policy to which the second terminal device subscribes.

In a possible implementation, the receiving unit 1001 may receive a second subscription information obtaining request from the session management network element, where the second subscription information obtaining request includes an identifier of a third terminal device.

The processing unit 1002 may determine a second user plane security policy based on the identifier of the third terminal device.

The sending unit 1003 may send a second subscription information obtaining response to the session management network element, where the second subscription information obtaining response includes the second user plane security policy.

In a possible implementation, the identifier of the third terminal device includes one or more of the following: a temporary identifier of the third terminal device, an anonymous identifier of the third terminal device, or a subscription permanent identifier SUPI of the third terminal device.

Based on a same inventive concept as the method embodiments, an embodiment of this application further provides a communication apparatus, configured to perform the methods performed by the unified data management network element or the UDM network element in the foregoing method embodiments. For related features, refer to the foregoing method embodiments. Details are not described herein again. As shown in FIG. 1i, the apparatus includes a receiving unit 1101 or a sending unit 1102.

The receiving unit 1101 is configured to receive a first subscription information obtaining request from a session management network element, where the first subscription information obtaining request requests a user plane security policy to which a first terminal device subscribes, and the user plane security policy to which the first terminal device subscribes indicates a user plane security policy of a relay-type session of the first terminal device and a user plane security policy of a non-relay-type session of the first terminal device.

The sending unit 1102 is configured to send a first subscription information obtaining response to the session management network element, where the first subscription information obtaining response includes the user plane security policy to which the first terminal device subscribes.

In a possible implementation, the apparatus further includes a processing unit 1103.

The receiving unit 1101 may receive a second subscription information obtaining request from the session management network element, where the second subscription information obtaining request includes an identifier of a third terminal device. The processing unit 1103 may determine a second user plane security policy based on the identifier of the third terminal device.

The sending unit 1102 may send a second subscription information obtaining response to the session management network element, where the second subscription information obtaining response includes the second user plane security policy.

Division into units in embodiments of this application is an example and is merely logical function division, and there may be another division manner during actual implementation. In addition, the functional units in embodiments of this application may be integrated into one processor, each of the units may exist alone physically, or two or more units are integrated into one module. The integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this application essentially or the part contributing to the prior art, or all or a part of the technical solutions may be embodied in a form of a software product. The computer software product is stored in a storage medium, and includes several instructions for instructing a terminal device (which may be a personal computer, a mobile phone, a network device, or the like) or a processor to perform all or some steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

In embodiments of this application, the unified data management network element, the session management network element, the access and mobility management network element, and the first terminal device each may be presented in a form of functional modules obtained through division in an integrated manner. The "module" herein may be a specific ASIC, a circuit, a processor and a memory that execute one or more software or firmware programs, an integrated logic circuit, and/or another component that can provide the foregoing functions.

Figure 12:
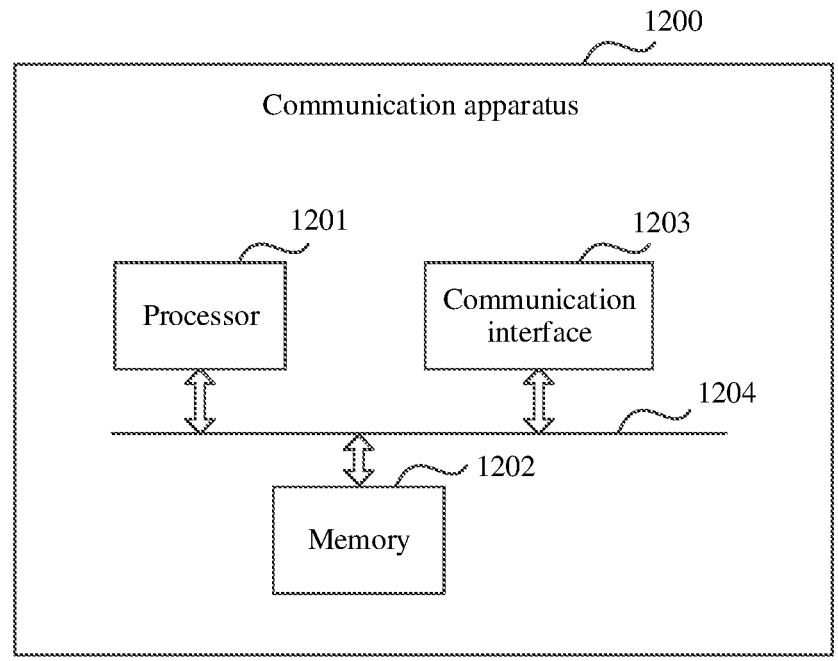

In a simple embodiment, a person skilled in the art may figure out that the unified data management network element, the session management network element, and the access and mobility management network element each may be in a form shown in FIG. 12.

A communication apparatus 1200 shown in FIG. 12 includes at least one processor 1201 and a memory 1202, and optionally, may further include a communication interface 1203.

The memory 1202 may be a volatile memory such as a random access memory. Alternatively, the memory may be a non-volatile memory, for example, a read-only memory, a flash memory, a hard disk drive (HDD), or a solid-state drive (SSD). Alternatively, the memory 1202 is any other medium that can be for carrying or storing expected program code in a form of instructions or a data structure and that can be accessed by a computer. However, this is not limited thereto. The memory 1202 may be a combination of the foregoing memories.

In this embodiment of this application, a specific connection medium between the processor 1201 and the memory 1202 is not limited. In this embodiment of this application, the memory 1202 is connected to the processor 1201 through a bus 1204 in the figure. The bus 1204 is indicated by a thick line in the figure. A mode of connection between other components is schematically described, and is not limited thereto. The bus 1204 may be classified into an address bus, a data bus, a control bus, and the like. For ease of representation, only one thick line is for representing the bus in FIG. 12, but this does not mean that there is only one bus or only one type of bus.

The processor 1201 may have a data sending/receiving function, and can communicate with another device. In the apparatus shown in FIG. 12, an independent data transceiver module, for example, the communication interface 1203, may also be disposed and is configured to send/receive data. When communicating with the another device, the processor 1201 may perform data transmission through the communication interface 1203.

When the session management network element is in the form shown in FIG. 12, the processor 1201 in FIG. 12 may invoke computer-executable instructions stored in the memory 1202, so that the session management network element can perform the method performed by the session management network element or the SMF network element in any one of the foregoing method embodiments.

Specifically, all functions/implementation processes of the sending unit, the receiving unit, and the processing unit in FIG. 7 may be implemented by the processor 1201 in FIG. 12 by invoking the computer-executable instructions stored in the memory 1202. Alternatively, a function/implementation process of the processing unit in FIG. 7 may be implemented by the processor 1201 in FIG. 12 by invoking the computer-executable instructions stored in the memory 1202, and functions/implementation processes of the sending unit and the receiving unit in FIG. 7 may be implemented by the communication interface 1203 in FIG. 12.

When the access and mobility management network element is in the form shown in FIG. 12, the processor 1201 in FIG. 12 may invoke computer-executable instructions stored in the memory 1202, so that the access and mobility management network element can perform the method performed by the access and mobility management network element or the AMF network element in any one of the foregoing method embodiments.

Specifically, all functions/implementation processes of the receiving unit, the sending unit, and the processing unit in FIG. 9 may be implemented by the processor 1201 in FIG. 12 by invoking the computer-executable instructions stored in the memory 1202. Alternatively, a function/implementation process of the processing unit in FIG. 9 may be implemented by the processor 1201 in FIG. 12 by invoking the computer-executable instructions stored in the memory 1202, and functions/implementation processes of the receiving unit and the sending unit in FIG. 9 may be implemented by the communication interface 1203 in FIG. 12.

When the unified data management network element is in the form shown in FIG. 12, the processor 1201 in FIG. 12 may invoke computer-executable instructions stored in the memory 1202, so that the unified data management network element can perform the method performed by the unified data management network element or the UDM network element in any one of the foregoing method embodiments.

Figure 11:
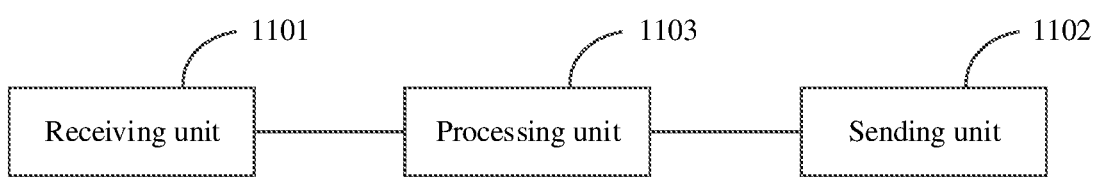

Specifically, all functions/implementation processes of the sending unit, the receiving unit, and the processing unit in FIG. 10 or FIG. 11 may be implemented by the processor 1201 in FIG. 12 by invoking the computer-executable instructions stored in the memory 1202. Alternatively, a function/implementation process of the processing unit in FIG. 10 or FIG. 11 may be implemented by the processor 1201 in FIG. 12 by invoking the computer-executable instructions stored in the memory 1202, and functions/implementation processes of the sending unit and the receiving unit in FIG. 10 or FIG. 11 may be implemented by the communication interface 1203 in FIG. 12.

Figure 13:
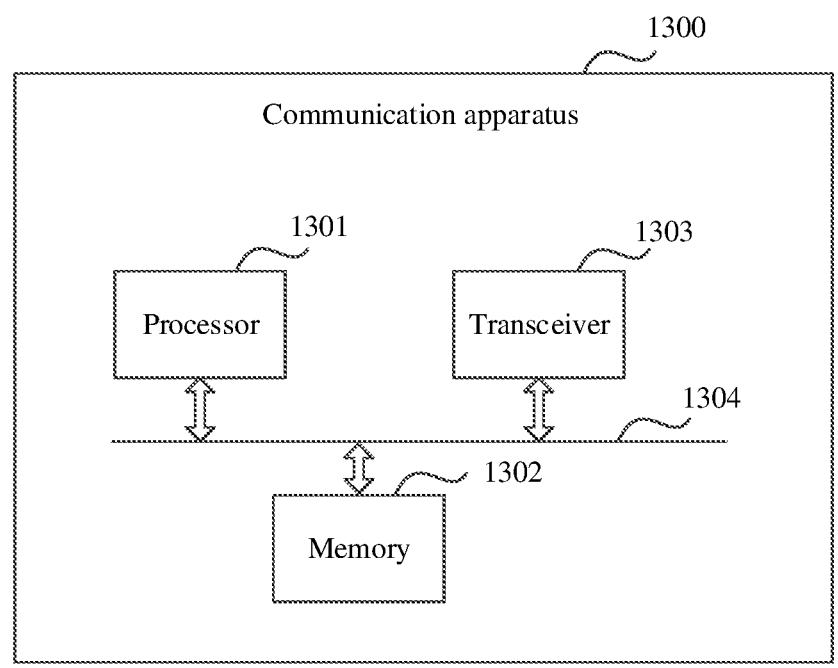

In a simple embodiment, a person skilled in the art may figure out that the first terminal device may be in a form shown in FIG. 13.

A communication apparatus 1300 shown in FIG. 13 includes at least one processor 1301 and a memory 1302, and optionally, may further include a transceiver 1303.

The processor 1301 and the memory 1302 are similar to the processor 1201 and the memory 1202. For details, refer to the foregoing content. Details are not described herein again.

In this embodiment of this application, a specific connection medium between the processor 1301 and the memory 1302 is not limited. In this embodiment of this application, the memory 1302 is connected to the processor 1301 through a bus 1304 in the figure. The bus 1304 is indicated by a thick line in the figure. A mode of connection between other components is schematically described, and is not limited thereto. The bus 1304 may be classified into an address bus, a data bus, a control bus, and the like. For ease of representation, only one thick line is for representing the bus in FIG. 13, but this does not mean that there is only one bus or only one type of bus.

The processor 1301 may have a data sending/receiving function, and can communicate with another device. In the apparatus shown in FIG. 13, an independent data transceiver module, for example, the transceiver 1303, may also be disposed and is configured to send/receive data. When communicating with the another device, the processor 1301 may perform data transmission through the transceiver 1303.

When the first terminal device is in the form shown in FIG. 13, the processor 1301 in FIG. 13 may invoke computer-executable instruction stored in the memory 1302, so that the first terminal device can perform the method performed by the first terminal device or the relay UE in any one of the foregoing method embodiments.

Specifically, all functions/implementation processes of the sending unit, the receiving unit, and the processing unit in FIG. 8 may be implemented by the processor 1301 in FIG. 13 by invoking the computer-executable instructions stored in the memory 1302. Alternatively, a function/implementation process of the processing unit in FIG. 8 may be implemented by the processor 1301 in FIG. 13 by invoking the computer-executable instructions stored in the memory 1302, and functions/implementation processes of the sending unit and the receiving unit in FIG. 8 may be implemented by the transceiver 1303 in FIG. 13.

In the method, a person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus configured to implement a specified function in one or more processes in the flowcharts and/or in one or more blocks in the block diagrams.

The computer program instructions may alternatively be stored in a computer-readable memory that can guide a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

The computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of the claims of this application and their equivalent technologies.

What is claimed is:

1. A method comprising:
receiving, by a session management network element, a first request requesting to create a relay-type session between a first device and an access network device, wherein the first device is a relay device for a remote device, the first request comprises first information indicating that a type of the relay-type session is a relay type;
determining, by the session management network element, first user plane security enforcement information of the relay-type session based on the first information; and
sending, by the session management network element, the first user plane security enforcement information of the relay-type session to the access network device, wherein the first user plane security enforcement information of the relay-type session indicates a first user plane security activation status of the relay-type session between the first device and the access network device, the first user plane security activation status indicating whether integrity protection and encryption protection between the first device and the access network device is enabled or disabled, and wherein whether integrity protection and encryption protection between the first device and the remote device is enabled or disabled depends on whether integrity protection and encryption protection between the first device and the access network device is enabled or disabled.

2. The method according to claim 1, wherein determining, by the session management network element, the first user plane security enforcement information of the relay-type session based on the first information comprises:
obtaining, by the session management network element, a first user plane security policy based on the first information; and
determining, by the session management network element, the first user plane security enforcement information of the relay-type session according to the first user plane security policy.

3. The method according to claim 2, wherein obtaining, by the session management network element, the first user plane security policy based on the first information comprises:
sending, by the session management network element, a first subscription information obtaining request to a unified data management network element, wherein the first subscription information obtaining request comprises the first information; and
receiving, by the session management network element, a first subscription information obtaining response from the unified data management network element, wherein the first subscription information obtaining response comprises the first user plane security policy.

4. The method according to claim 1, wherein the method further comprises:
receiving, by the session management network element, a second request comprising an identifier of a second device, wherein the second request indicates that the second device is to use the relay-type session;

determining, by the session management network element, second user plane security enforcement information of the relay-type session based on the identifier of the second device; and sending, by the session management network element, the second user plane security enforcement information of the relay-type session to the access network device, wherein the second user plane security enforcement information of the relay-type session indicates a second user plane security activation status of the relay-type session between the first device and the access network device.

5. The method according to claim 4, wherein determining, by the session management network element, the second user plane security enforcement information of the relay-type session based on the identifier of the second device comprises:

determining, by the session management network element, a second user plane security policy based on the identifier of the second device; and determining, by the session management network element, the second user plane security enforcement information of the relay-type session according to the second user plane security policy.

6. The method according to claim 4, wherein before sending, by the session management network element, the second user plane security enforcement information of the relay-type session to the access network device, the method further comprises:

determining, by the session management network element, that the first user plane security enforcement information of the relay-type session is different from the second user plane security enforcement information of the relay-type session.

7. A communications apparatus, comprising:

a processor, coupled to a non-transitory memory storing instructions, and configured to execute the instructions to cause the communications apparatus to:

receive a first request requesting to create a relay-type session between a first device and an access network device, wherein the first device is a relay device for a remote device, the first request comprises first information indicating that a type of the relay-type session is a relay type;

determine first user plane security enforcement information of the relay-type session based on the first information; and send the first user plane security enforcement information of the relay-type session to the access network device, wherein the first user plane security enforcement information of the relay-type session indicates a first user plane security activation status of the relay-type session between the first device and the access network device, the first user plane security activation status indicating whether integrity protection and encryption protection between the first device and the access network device is enabled or disabled, and wherein whether integrity protection and encryption protection between the first device and the remote device is enabled or disabled depends on whether integrity protection and encryption protection between the first device and the access network device is enabled or disabled.

8. The communications apparatus according to claim 7, wherein the instructions, when executed by the processor, cause the communications apparatus further to:

obtain a first user plane security policy based on the first information; and determine the first user plane security enforcement information of the relay-type session according to the first user plane security policy.

9. The communications apparatus according to claim 8, wherein the instructions, when executed by the processor, cause the communications apparatus further to:

send a first subscription information obtaining request to a unified data management network element, wherein the first subscription information obtaining request comprises the first information; and receive a first subscription information obtaining response from the unified data management network element, wherein the first subscription information obtaining response comprises the first user plane security policy.

10. The communications apparatus according to claim 7, wherein the instructions, when executed by the processor, cause the communications apparatus further to:

receive a second request comprising an identifier of a second device, wherein the second request indicates that the second device is to use the relay-type session;

determine second user plane security enforcement information of the relay-type session based on the identifier of the second device; and send the second user plane security enforcement information of the relay-type session to the access network device, wherein the second user plane security enforcement information of the relay-type session indicates a second user plane security activation status of the relay-type session between the communications apparatus and the access network device.

11. The communications apparatus according to claim 10, wherein the instructions, when executed by the processor, cause the communications apparatus further to:

determine a second user plane security policy based on the identifier of the second device; and determine the second user plane security enforcement information of the relay-type session according to the second user plane security policy.

12. The communications apparatus according to claim 10, wherein the instructions, when executed by the processor, cause the communications apparatus further to: determine that the first user plane security enforcement information of the relay-type session is different from the second user plane security enforcement information of the relay-type session.

13. A system, comprising:

a remote device;

a first device, configured to act as a relay for the remote device;

an access network device;

a session management network element, configured to:

receive a first request requesting to create a relay-type session between a first device and the access network device, wherein the first request comprises first information indicating that a type of the relay-type session is a relay type;

determine first user plane security enforcement information of the relay-type session based on the first information; and send the first user plane security enforcement information of the relay-type session to the access network device, wherein the first user plane security enforcement information of the relay-type session indicates a first user plane security activation status of the relay-type session between the first device and the access network device, the first user plane security activation status indicating whether integrity protection and encryption protection between the first device and the access network device is enabled or disabled, and wherein whether integrity protection and encryption protection between the first device and the remote device is enabled or disabled depends on whether integrity protection and encryption protection between the first device and the access network device is enabled or disabled.

14. The system according to claim 13, wherein the session management network element is configured to:
obtain a first user plane security policy based on the first information; and
determine the first user plane security enforcement information of the relay-type session according to the first user plane security policy.

15. The system according to claim 14, wherein the session management network element is further configured to:
send a first subscription information obtaining request to a unified data management network element, wherein the first subscription information obtaining request comprises the first information; and
receive a first subscription information obtaining response from the unified data management network element, wherein the first subscription information obtaining response comprises the first user plane security policy.

16. The system according to claim 13, wherein the session management network element is further configured to:
receive a second request comprising an identifier of a second device, wherein the second request indicates that the second device is to use the relay-type session;
determine second user plane security enforcement information of the relay-type session based on the identifier of the second device; and
send the second user plane security enforcement information of the relay-type session to the access network device, wherein the second user plane security enforcement information of the relay-type session indicates a second user plane security activation status of the relay-type session between the first device and the access network device.

17. The system according to claim 16, wherein the session management network element is further configured to:
determine a second user plane security policy based on the identifier of the second device; and
determine the second user plane security enforcement information of the relay-type session according to the second user plane security policy.

18. The system according to claim 17, wherein the session management network element is further configured to:
determine that the first user plane security enforcement information of the relay-type session is different from the second user plane security enforcement information of the relay-type session.

* * * * *